(12) United States Patent
Takeshita

(10) Patent No.: US 9,336,044 B2
(45) Date of Patent: May 10, 2016

(54) PARALLEL COMPUTER, AND JOB INFORMATION ACQUISITION METHOD FOR PARALLEL COMPUTER

(71) Applicant: FUJITSU LIMITED, Kawasaki-shi, Kanagawa (JP)

(72) Inventor: Hiroto Takeshita, Fuji (JP)

(73) Assignee: FUJITSU LIMITED, Kawasaki (JP)

( * ) Notice: Subject to any disclaimer, the term of this patent is extended or adjusted under 35 U.S.C. 154(b) by 510 days.

(21) Appl. No.: 13/778,494

(22) Filed: Feb. 27, 2013

(65) Prior Publication Data

US 2013/0174170 A1 Jul. 4, 2013

Related U.S. Application Data

(63) Continuation of application No. PCT/JP2010/064639, filed on Aug. 27, 2010.

(51) Int. Cl.
*G06F 9/46* (2006.01)
*G06F 11/34* (2006.01)

(52) U.S. Cl.
CPC .............. *G06F 9/46* (2013.01); *G06F 11/3404* (2013.01); *G06F 11/3476* (2013.01); *G06F 11/3495* (2013.01); *G06F 2201/84* (2013.01)

(58) Field of Classification Search
None
See application file for complete search history.

(56) References Cited

U.S. PATENT DOCUMENTS

| 5,802,303 | A | 9/1998 | Yamaguchi |
| 6,279,001 | B1 * | 8/2001 | DeBettencourt et al. |
| 2007/0106857 | A1 | 5/2007 | Koning et al. |
| 2009/0241145 | A1 * | 9/2009 | Sharma ............................ 725/43 |

FOREIGN PATENT DOCUMENTS

| DE | 103 27 155 A1 | 1/2005 |
| EP | 0 790 559 A1 | 8/1997 |
| JP | 63-136176 | 6/1988 |
| JP | 8-44680 | 2/1996 |
| JP | 2002-324014 | 11/2002 |
| JP | 2007-128122 | 5/2007 |

OTHER PUBLICATIONS

International Search Report, dated Nov. 16, 2010, in corresponding International Application No. PCT/JP2010/064639 (3 pp.).
Written Opinion of the International Searching Authority, dated Nov. 16, 2010, in corresponding International Application No. PCT/JP2010/064639 (3 pp.).
Extended European Search Report dated Oct. 5, 2015 in corresponding European Patent Application No. 10856443.6.

* cited by examiner

*Primary Examiner* — Mengyao Zhe
(74) *Attorney, Agent, or Firm* — Staas & Halsey LLP

(57) ABSTRACT

A parallel computer includes a plurality of calculation nodes and a management node. A calculation node includes a retention control unit that retains job information in a retention unit in association with an identification number, and the management node includes a retention control unit that retains the job information in a retention unit, retains, as a snapshot, job information of the same identification number in a case where the job information of the same identification number about a calculation node is detected in the retention unit. The retention unit of the calculation node includes a retention region enabling retention of job information corresponding to a plurality of periods, and the retention unit of the management node includes a retention region enabling retention of the job information corresponding to the plurality of periods with respect to each of the calculation nodes.

8 Claims, 13 Drawing Sheets

PARALLEL COMPUTER, AND JOB INFORMATION ACQUISITION METHOD FOR PARALLEL COMPUTER

CROSS-REFERENCE TO RELATED APPLICATION

This application is a continuation of International Application No. PCT/JP2010/064639, filed on Aug. 27, 2010 and designating the U.S., the entire contents of which are incorporated herein by reference.

FIELD

The present invention relates to a parallel computer, and a job information acquisition method for parallel computer.

BACKGROUND

A parallel computer can process large-scale calculation, for example, by connecting a plurality of computers (hereinafter, referred to as calculation nodes) through a network, distributing a calculation job among separate calculation nodes, and executing the calculation job in parallel. Accordingly, the demand for the parallel computer is increasing rapidly.

In general, a parallel computer includes a node managing a calculation node group (hereinafter, simply referred to as a management node) including a plurality of calculation nodes. The parallel computer may require technology that enables a management node side to recognize information such as usage of respective resources such as a CPU, a memory and a file used in each calculation node by a currently-executed calculation job, and the number of commands executed by the calculation job (hereinafter, simply referred to as job information).

Thus, each calculation node executing a calculation job may need to acquire job information of the same time, that is, a snapshot. FIG. 14 is an illustration diagram illustrating a snapshot acquisition method for a parallel computer. In a parallel computer 110 illustrated in FIG. 14, a management node 112 managing a plurality of calculation nodes 111 manages the current time, and requests each calculation node 111 to acquire job information when the current time arrives at a predetermined time (step S211). In response to the job information acquisition request, each calculation node 111 acquires own job information (step S212). When acquiring the job information, each calculation node 111 transmits the acquired job information to the management node 112 (step S213). As a result, the management node 112 of the parallel computer 110 illustrated in FIG. 14 can acquire job information of the same time (timing) of each calculation node 111, that is, a snapshot.

FIG. 15 is an illustration diagram illustrating another snapshot acquisition method for a parallel computer 120. In the parallel computer 120 illustrated in FIG. 15, each calculation node 121 manages the current time. When the current time arrives at a predetermined time, each calculation node 121 acquires own job information (step S221). When acquiring own job information, each calculation node 121 transmits the acquired job information to a management node 122 (step S222). As a result, the management node 122 of the parallel computer 120 illustrated in FIG. 15 can acquire job information of the same time (timing) of each calculation node 121, that is, a snapshot.

Patent Document 1: Japanese Laid-open Patent Publication No. 8-44680
Patent Document 2: Japanese Laid-open Patent Publication No. 63-136176

In the parallel computer 110 illustrated in FIG. 14, when a gap occurs in the timing until the arrival of the job information acquisition request from the management node 112 at the respective calculation nodes 111, the job information acquisition timing is not synchronized between the calculation nodes 111, so that an accurate snapshot is difficult to acquire.

Also, in the parallel computer 120 illustrated in FIG. 15, since the job information is asynchronously transmitted from the respective calculation nodes 121, there may be a case where the job information of the same time (same timing) transmitted from the respective calculation nodes 121 is not received at the management node 122 till the next job information acquisition time. As a result, job information of different times may be received in a mixed manner. That is, in the parallel computer 120, since the job information of the same timing of the respective calculation nodes 121 is not known, an accurate snapshot is difficult to acquire.

SUMMARY

According to an aspect of an embodiment of the invention, a parallel computer includes a plurality of calculation nodes that execute a calculation job distributively in parallel, and a management node that manages the plurality of calculation nodes. The calculation node includes an acquisition unit that acquires job information about a calculation job handled by the calculation node according to a period timing common to the calculation nodes, a retention control unit that retains the job information in a retention unit of the calculation node in association with an identification number identifying the period timing at which the job information is acquired by the acquisition unit, and clears all the job information retained in the retention unit when a clear request is received from the management node, and an information transmission unit that, when a transmission request for the job information about a designated identification number is received, transmits the job information about the designated identification number to the management node in a case where the job information about the designated identification number exists in the retention unit, and transmits job information about an identification number just before the designated identification number to the management node in a case where the job information about the designated identification number does not exist in the retention unit and the job information about the identification number just before the designated identification number exists in the retention unit. The management node includes a retention control unit that retains the job information in a retention unit of the management node when the job information is received from each of the calculation nodes according to the transmission request, retains, as a snapshot, job information of the same identification number in a case where the job information of the same identification number about the calculation nodes is detected in the retention unit, and clears job information other than the job information of the same identification number retained in the retention unit of the management node, and a clear request unit that transmits the clear request to each of the calculation nodes when the job information of the same identification number is retained as a snapshot. The retention unit of the calculation node includes a retention region enabling retention of job information corresponding to a plurality of periods, and the retention unit of the management node includes a retention region enabling retention of the job information corresponding to the plurality of periods with respect to each of the calculation nodes.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings. In addition, the embodiments do not limit the technique disclosed herein.

[a] First Embodiment

Figure 1:
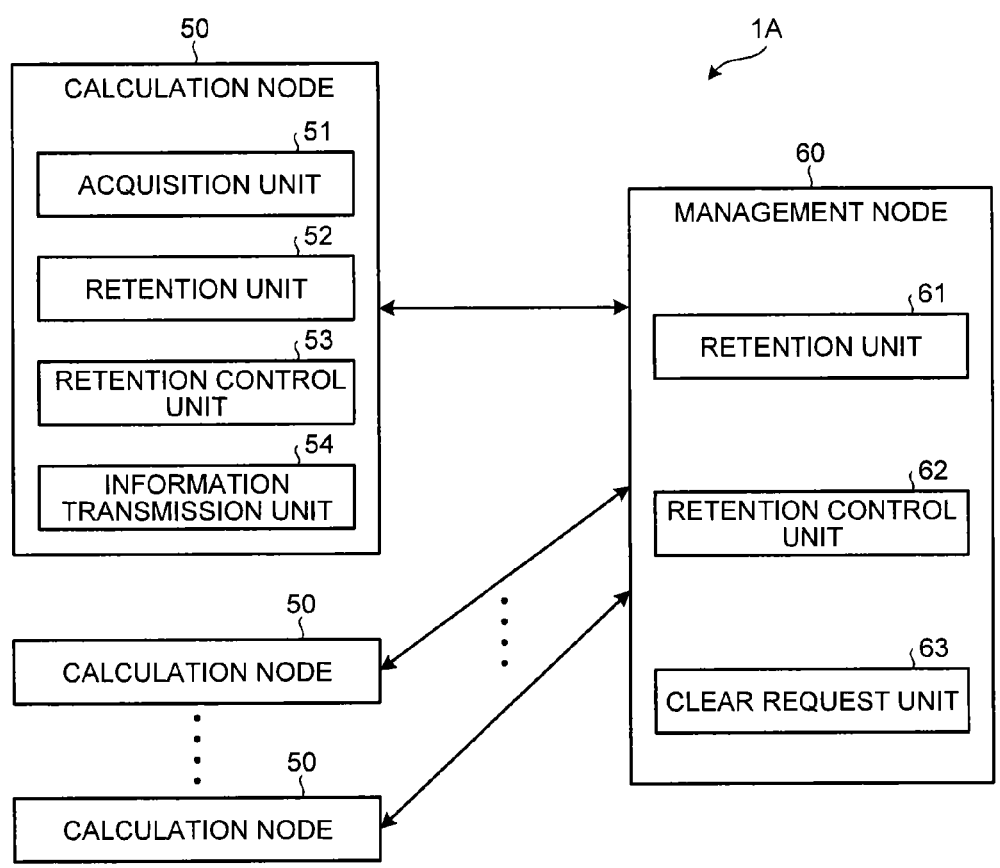
FIG. 1 is a block diagram illustrating a parallel computer according to a first embodiment.

FIG. 1 is a block diagram illustrating a parallel computer according to a first embodiment. A parallel computer 1A illustrated in FIG. 1 includes a plurality of calculation nodes 50 executing a calculation job distributively in parallel, and a management node 60 managing the plurality of calculation nodes 50. The calculation node 50 includes an acquisition unit 51, a retention unit 52, a retention control unit 53, and an information transmission unit 54. According to the period timing common to the calculation nodes, the acquisition unit 51 acquires job information about a calculation job handled by the relevant calculation node 50.

The retention control unit 53 retains the job information in the retention unit 52 of the calculation node 50 in association with an identification number identifying the period timing at which the acquisition unit 51 acquires the job information. Also, when receiving a clear request from the management node 60, the retention control unit 53 clears all of the job information retained in the retention unit 52. The retention unit 52 includes a retention region retaining own job information corresponding to a predetermined number of periods, for example, two periods (generations).

Also, when receiving a job information transmission request for a designated identification number from the management node 60, when job information of the designated identification number exists in the retention unit 52, the information transmission unit 54 transmits the job information of the designated identification number to the management node 60. Also, when the job information of the designated identification number does not exist in the retention unit 52 and job information of an identification number just before the designated identification number exists therein, the information transmission unit 54 transmits the job information of the identification number to the management node 60. Also, the identification number just before the designated identification number corresponds to, for example, a one-generation-ago identification number.

The management node 60 includes a retention unit 61, a retention control unit 62, and a clear request unit 63. The retention unit 61 includes a retention region capable of retaining job information corresponding to a predetermined number of periods for each calculation node 50. When receiving the job information from each calculation node 50 according to the transmission request, the retention control unit 62 retains the received job information in the retention unit 61 of the management node 60. Also, when detecting job information of the same identification number about all the calculation nodes 50 in the retention unit 61, the retention control unit 62 retains the job information of the same identification number as a snapshot. When the job information of the same identification number is retained as a snapshot, the retention control unit 62 clears job information other than the job information of the same identification number retained in the retention unit 61 of the management node 60. When the job information of the same identification number is retained as a snapshot, the clear request unit 63 transmits a clear request to each calculation node 50.

In the first embodiment, the calculation node 50 acquires the job information according to the period timing common to the calculation nodes, and retains the acquired job information in the retention unit 52 of the calculation node 50 in association with the identification number identifying the period timing at which the job information is acquired. In addition, in the first embodiment, when receiving the job information from each calculation node 50 according to the transmission request, the management node 60 retains the received job information in the retention unit 61 of the management node 60. In the first embodiment, when detecting job information of the same identification number about the calculation nodes in the retention unit 61, the calculation node 50 retains the job information of the same identification number as a snapshot. In addition, in the first embodiment, when the job information of the same identification number is retained as a snapshot, the job information other than the job information of the same identification number retained in the retention unit 61 of the management node 60 is cleared and all of the job information retained in the retention unit 52 of the calculation node 50 is cleared. As a result, since the job information is managed in association with the identification number of the period timing at which the job information is acquired, an accurate snapshot of the job information between the calculation nodes 50 can be secured.

In the first embodiment, the retention unit 52 of the calculation node 50 includes a retention region capable of retaining job information corresponding to a predetermined number of periods, and the retention unit 61 of the management node 60 includes a retention region capable of retaining job information corresponding to a predetermined number of periods for each calculation node 50. As a result, for example, the job information clear timing caused by the delay of transmission of the clear request from the management node 60 is different in each calculation node 50. Accordingly, the impossibility of collecting the job information of each calculation node 50 by the management node 60 can be avoided, and the accurate snapshot of the calculation job executed in the parallel computer 1A can be secured.

[b] Second Embodiment

Figure 2:
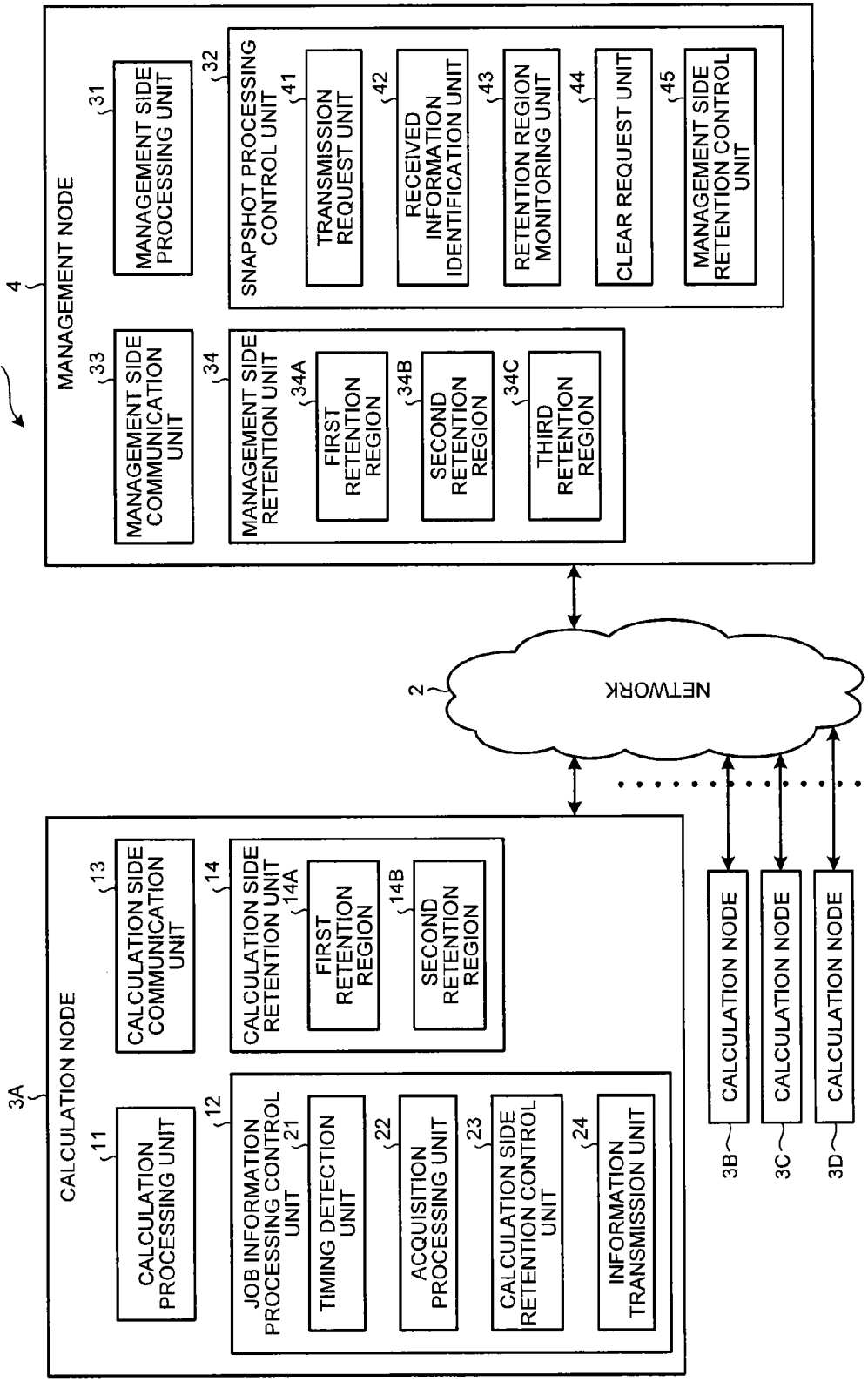
FIG. 2 is a block diagram illustrating a parallel computer according to a second embodiment.
Figure 3:
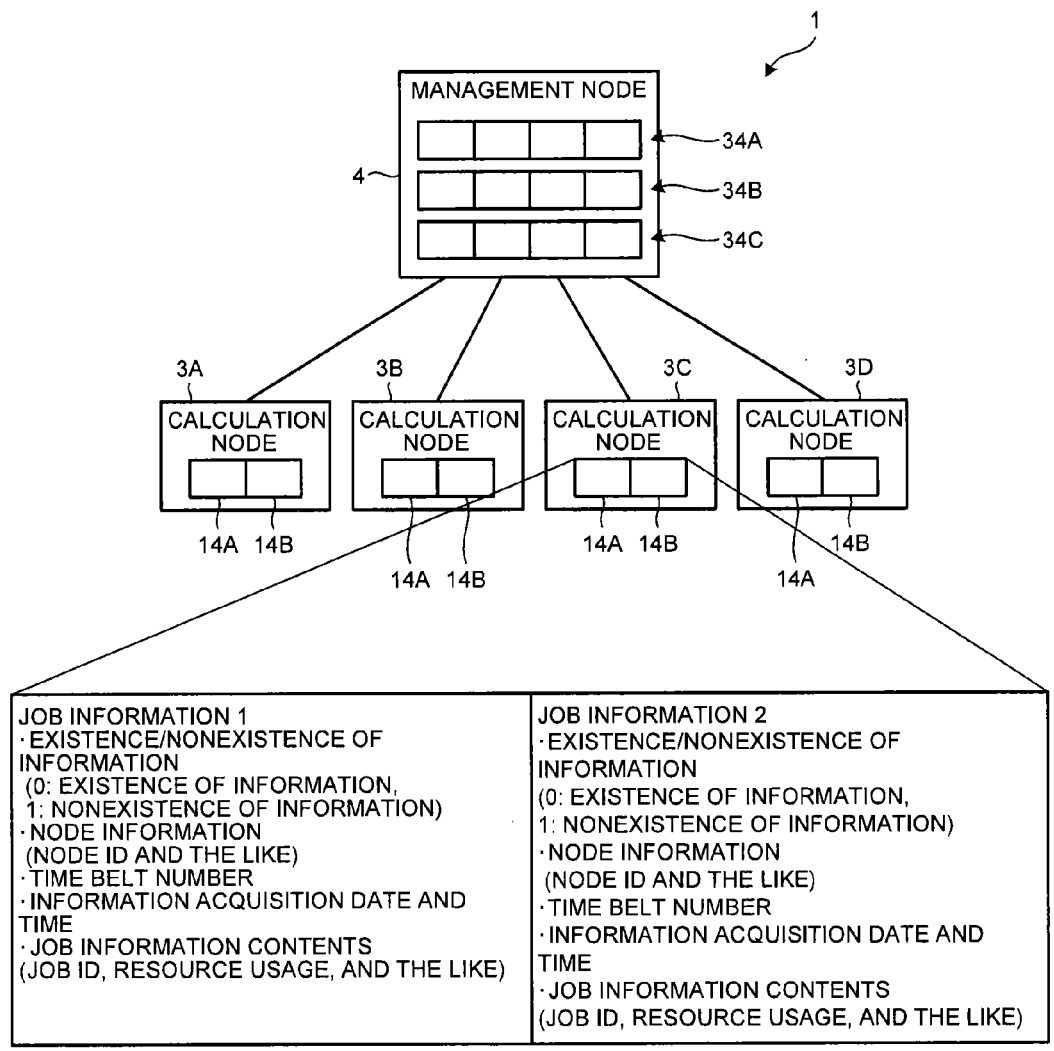
FIG. 3 is an illustration diagram of a parallel computer.

FIG. 2 is a block diagram illustrating a parallel computer according to a second embodiment, and FIG. 3 is an illustration diagram of the parallel computer. A parallel computer 1 illustrated in FIG. 2 includes a plurality of calculation nodes 3 connected to a network 2, and a management node 4 managing the plurality of calculation nodes 3. The parallel computer 1 distributes calculation job among the respective calculation nodes 3 and executes calculation in parallel. Also, although four calculation nodes 3 (3A to 3D) are illustrated for the convenience of description, the number of calculation nodes 3 is not limited thereto.

The calculation node 3 corresponds to, for example, a computer, and executes a calculation job. The calculation node 3 includes a calculation processing unit 11, a job information processing control unit 12, a calculation side communication unit 13, and a calculation side retention unit 14. The calculation processing unit 11 executes an own calculation job among the distributed calculation jobs. The calculation side communication unit 13 communicates with the management node 4 through the network 2. The calculation side retention unit 14 corresponds to, for example, a buffer or the like. The calculation side retention unit 14 includes a first retention region 14A and a second retention region 14B retaining job information corresponding to two generations, that is, two time belts.

Figure 4:
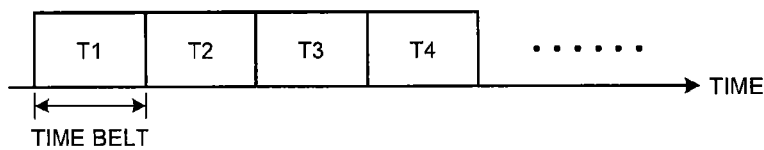
FIG. 4 is an illustration diagram of a job information acquisition period (time belt)

The job information processing control unit 12 includes a timing detection unit 21, an acquisition processing unit 22, a calculation side retention control unit 23, and an information transmission unit 24. The timing detection unit 21 detects the timing of acquiring own job information. The timing detection unit 21 starts a timer operation according to a job start command common to the calculation nodes 3. Also, FIG. 4 is an illustration diagram of a job information acquisition period (time belt). The timing detection unit 21 detects the job information acquisition timing by using the period timing common to the calculation nodes, that is, the time belt of FIG. 4. When the timing detection unit 21 acquires the job information acquisition timing, the acquisition processing unit 22 acquires own job information.

The calculation side retention control unit 23 controls the retention by the calculation side retention unit 14, and retains the job information retained by the acquisition processing unit 22 in the calculation side retention unit 14. Also, the job information includes job information contents, information existence/nonexistence, node information, time belt number, information acquisition date and time, and the like. The job information contents include usage of resources such as a job ID identifying a job and a CPU, a memory and a file used in an own job, and the number of commands executed by the job.

The information existence/nonexistence is information indicating the existence/nonexistence of job information. Also, in the case of information existence, the job information corresponds to job information having job information contents, and in the case of job nonexistence, the job information corresponds to error information that will be described below. The node information corresponds to a node ID identifying the calculation node 3 that is the source of the job information. The time belt number corresponds to a number identifying the period timing common to the calculation nodes 3 having acquired the job information. The information acquisition date and time correspond to the date and time of acquisition of the job information.

When acquiring the own job information according to the job information acquisition timing, the calculation side retention control unit 23 determines whether an empty space exists in the retention region of the calculation side retention unit 14. When an empty space exists in the retention region of the calculation side retention unit 14, the calculation side retention control unit 23 retains the job information in the calculation side retention unit 14. Also, when an empty space does not exist in the retention region of the calculation side retention unit 14, the calculation side retention control unit 23 prohibits the retention of the job information.

According to a designated time belt number transmission request from the management node 4, which will be described below, the calculation side retention control unit 23 determines whether job information of a designated time belt number exists in the calculation side retention unit 14. When job information of a designated time belt number exists in the calculation side retention unit 14, the calculation side retention control unit 23 transmits the job information of the designated time belt number to the management node 4 through the calculation side communication unit 13. Also, when job information of a designated time belt number does not exist in the calculation side retention unit 14, the calculation side retention control unit 23 determines whether job information one generation before the designated time belt number exists in the calculation side retention unit 14. Also, when job information one generation before the designated time belt number exists in the calculation side retention unit 14, the calculation side retention control unit 23 transmits the job information one generation before the designated time belt number to the management node 4 through the calculation side communication unit 13. Also, when job information one generation before the designated time belt number does not exist in the calculation side retention unit 14, the calculation side retention control unit 23 transmits error information to the management node 4 through the calculation side communication unit 13. Also, according to a clear request from the management node 4, which will be described below, the calculation side retention control unit 23 clears all of the job information retained in the calculation side retention unit 14.

Also, for the convenience of description, one calculation node 3A among the four calculation nodes 3 (3A to 3D) is referred to as a representative node. The representative node has substantially the same internal configuration as the calculation node 3, but is characterized by having a function described below. The job information processing control unit 12 of the representative node acquires job information according to the period timing common to the calculation nodes 3, and retains the job information in the calculation side retention unit 14. In addition, when retaining job information in the calculation side retention unit 14, the job information processing control unit 12 notifies a time belt number of the job information to the management node 4 as a transmission request target through the calculation side communication unit 13.

The management node 4 corresponds to, for example, a computer. The management node 4 connects with each calculation node 3 through the network 2 to manage each calculation node 3. The management node 4 includes a management side processing unit 31, a snapshot processing control unit 32, a management side communication unit 33, and a management side retention unit 34. The management side processing unit 31 manages the distributed calculation nodes 3. The management side communication unit 33 communicates with each calculation node 3 through the network 2. The management side retention unit 34 corresponds to, for example, a buffer or the like. The management side retention unit 34 includes a first retention region 34A, a second retention region 34B and a third retention region 34C retaining job information corresponding to three generations, that is, three time belts. Also, the first retention region 34A retains job information about a snapshot, and the second retention region 34B and the third retention region 34C are used to temporarily retain job information in order to acquire a snapshot. Also, when not retaining job information of a snapshot, the first retention region 34A is used to temporarily retain job information, like the second retention region 34B and the third retention region 34C.

The snapshot processing control unit 32 includes a transmission request unit 41, a received information identification unit 42, a retention region monitoring unit 43, a clear request unit 44, and a management side retention control unit 45. When receiving a time belt number of a transmission request target from the representative node, the transmission request unit 41 requests the transmission of job information about the time belt number from each calculation node 3 through the management side communication unit 33. The received information identification unit 42 identifies the received information of each calculation node 3 received according to a transmission request of a designated time belt number to each calculation node 3. Also, the received information is received from the calculation node 3, and includes, for example, job information of a designate time belt number, job information of a time belt number one generation before the designated time belt number, error information, and the like.

The retention region monitoring unit 43 monitors the job information of the respective calculation nodes 3 retained in the first retention region 34A, the second retention region 34B and the third retention region 34C. In addition, based on the job information monitoring result, the retention region monitoring unit 43 determines whether there is a new time belt number corresponding to the timing that could retain the job information of all the calculation nodes 3. When there is a new time belt number that could retain the job information of all the calculation nodes 3, the management side retention control unit 45 determines that a snapshot of the same time belt number is newly acquired, and updates/registers the job information of all the calculation nodes 3 of the same time belt number in the first retention region 34A. In addition, the management side retention control unit 45 clears all the job information of the respective calculation nodes 3 retained in the second retention region 34B and the third retention region 34C. Also, when a new snapshot is acquired, the clear request unit 44 requests the clear of all the job information retained in the calculation side retention unit 14 of all the calculation nodes 3 through the management side communication unit 33.

Also, for example, when detecting a snapshot presentation request from a user terminal, the management node 4 presents the user terminal with the job information of the same time belt number of all the calculation nodes 3 retained in the first retention region 34A of the management side retention unit 34, as a snapshot. That is, the user can know the job information of each calculation node 3 with respect to the job that is being executed.

Figure 5:
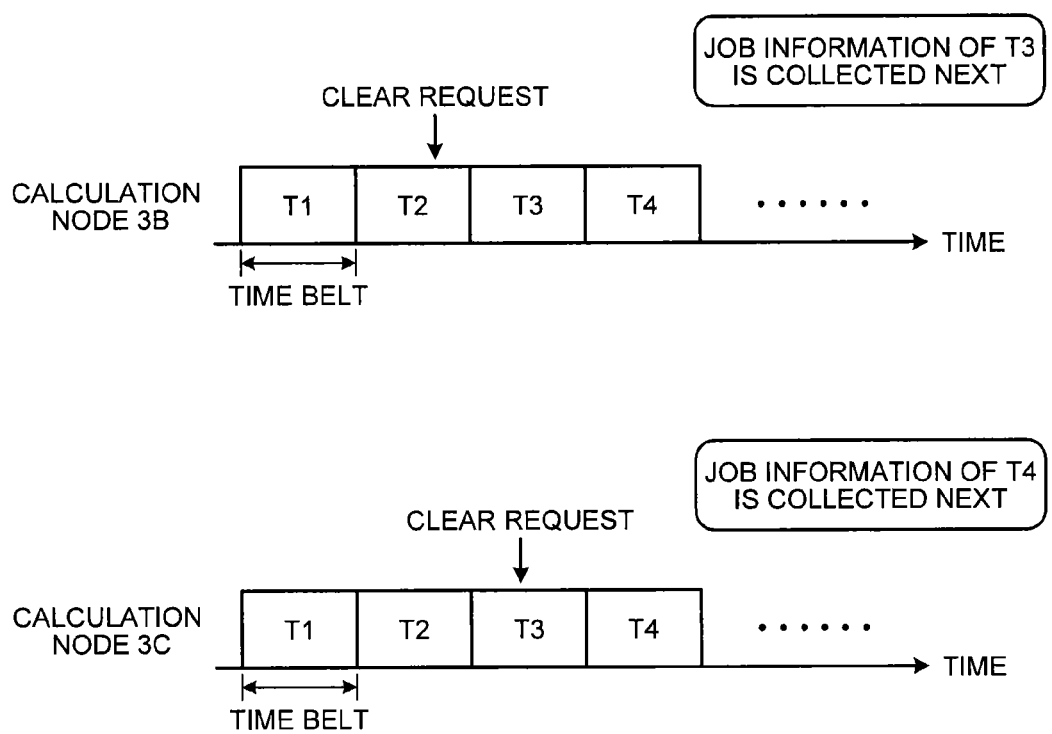
FIG. 5 is an illustration diagram illustrating the reason for setting a calculation side retention unit corresponding to two generations.

Next, the reason for setting the calculation side retention unit 14 to include a region retaining the job information corresponding to two generations, that is, two time belts will be described. FIG. 5 is an illustration diagram illustrating the reason for setting the calculation side retention unit 14 corresponding to two generations. When job information of a new snapshot is retained, the management node 4 issues a clear request to each calculation node 3.

In FIG. 5, when the timing of arrival of the clear request from the management node 4 is the timing of acquiring the job information of a time belt number T2, the calculation node 3B clears all the job information up to the time belt number T2 retained in the calculation side retention unit 14. As a result, in the calculation node 3B, the job information to be acquired next is the job information of a time belt number T3.

Also, when the timing of arrival of the clear request from the management node 4 is the timing of acquiring the job information of a time belt number T3, the calculation node 3C clears all the job information up to the time belt number T3 retained in the calculation side retention unit 14. As a result, in the calculation node 3C, the job information to be acquired next is the job information of a time belt number T4.

That is, since the timing of arrival of the clear request is different between the calculation nodes 3, the job information to be acquired may be missed by one generation, that is, one time belt. Accordingly, the calculation side retention unit 14 of each calculation node 3 is provided with the first retention region 14A and the second retention region 14B as retention regions for retaining the job information corresponding to two time belts in order to absorb a gap corresponding to one time belt.

In addition, the reason for setting the management side retention unit 34 to include a region retaining the job information corresponding to three generations, that is, three time belts will be described. For example, when the job information of the same time belt number T1 of all calculation nodes 3 is retained, that is, when a snapshot of the time belt number T1 is acquired, the job information of the relevant time belt number is retained in the first retention region 34A. The second retention region 34B and the third retention region 34C are used until the job information of the next time belt number of all the calculation nodes 3 is retained. However, as described above, when a gap between the calculation nodes 3 with respect to the clear request corresponds to one generation, the job information transmitted to the management node 4 from each calculation node 3 is also missed by one generation. Accordingly, the management side retention unit 34 uses the first retention region 34A to retain the job information of a snapshot, and is provided with the second retention region 34B and the third retention region 34C as retention regions for retaining the job information corresponding to two time belts in order to absorb a gap corresponding to one time belt.

Figure 6:
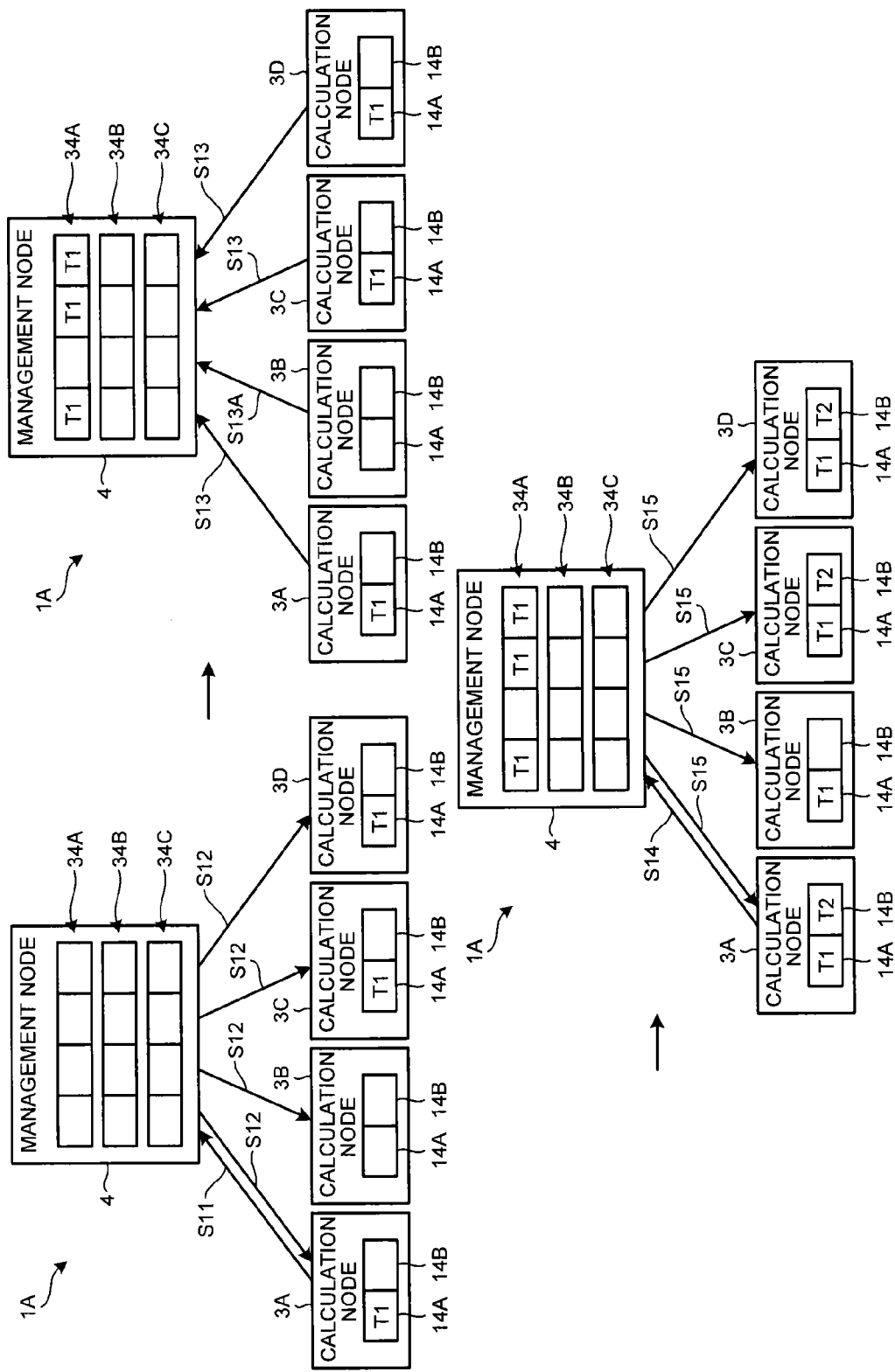
FIG. 6 is an illustration diagram illustrating an example of an operation transition for snapshot acquisition of a parallel computer.
Figure 7:
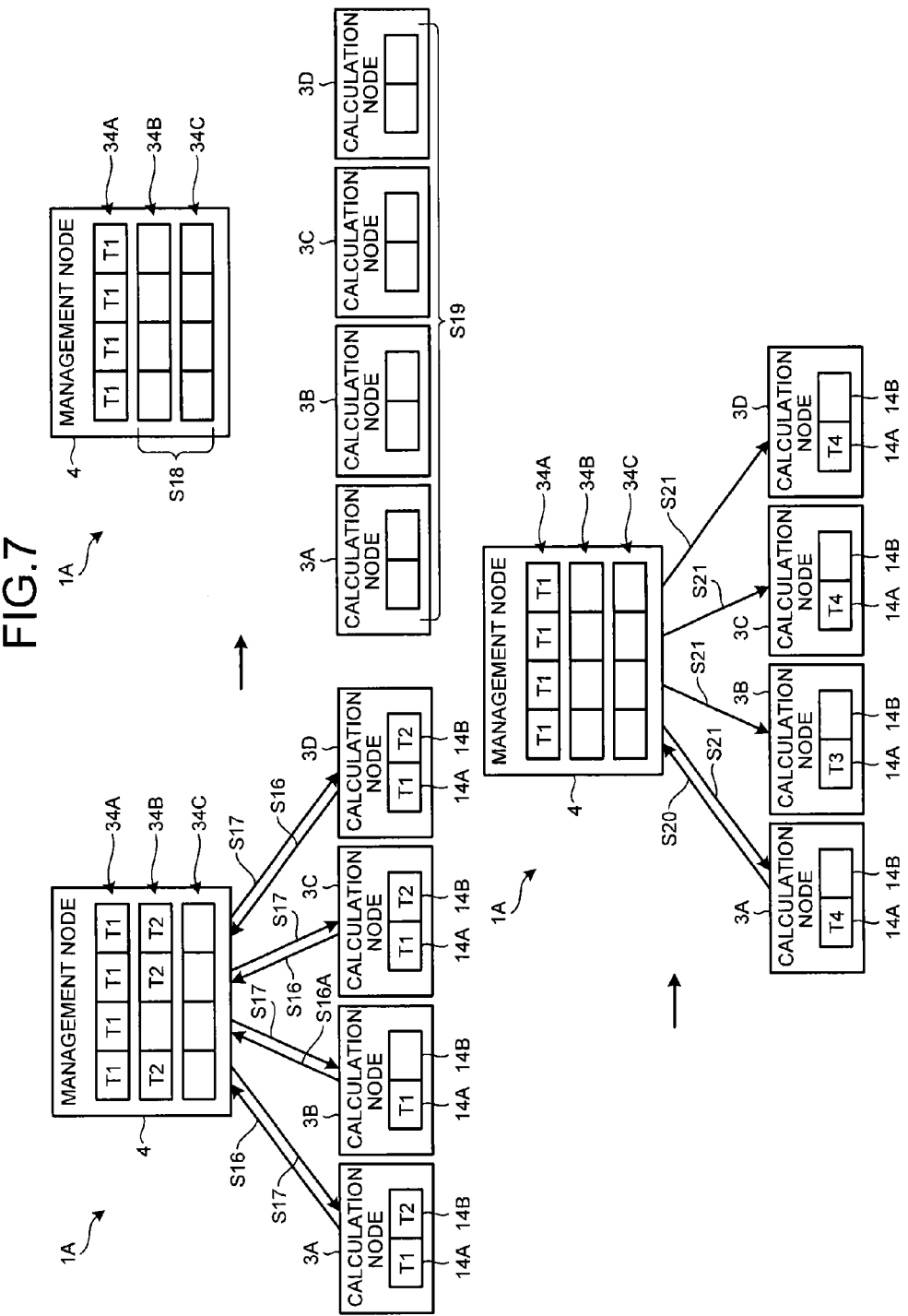
FIG. 7 is an illustration diagram illustrating an example of an operation transition for snapshot acquisition of a parallel computer.
Figure 8:
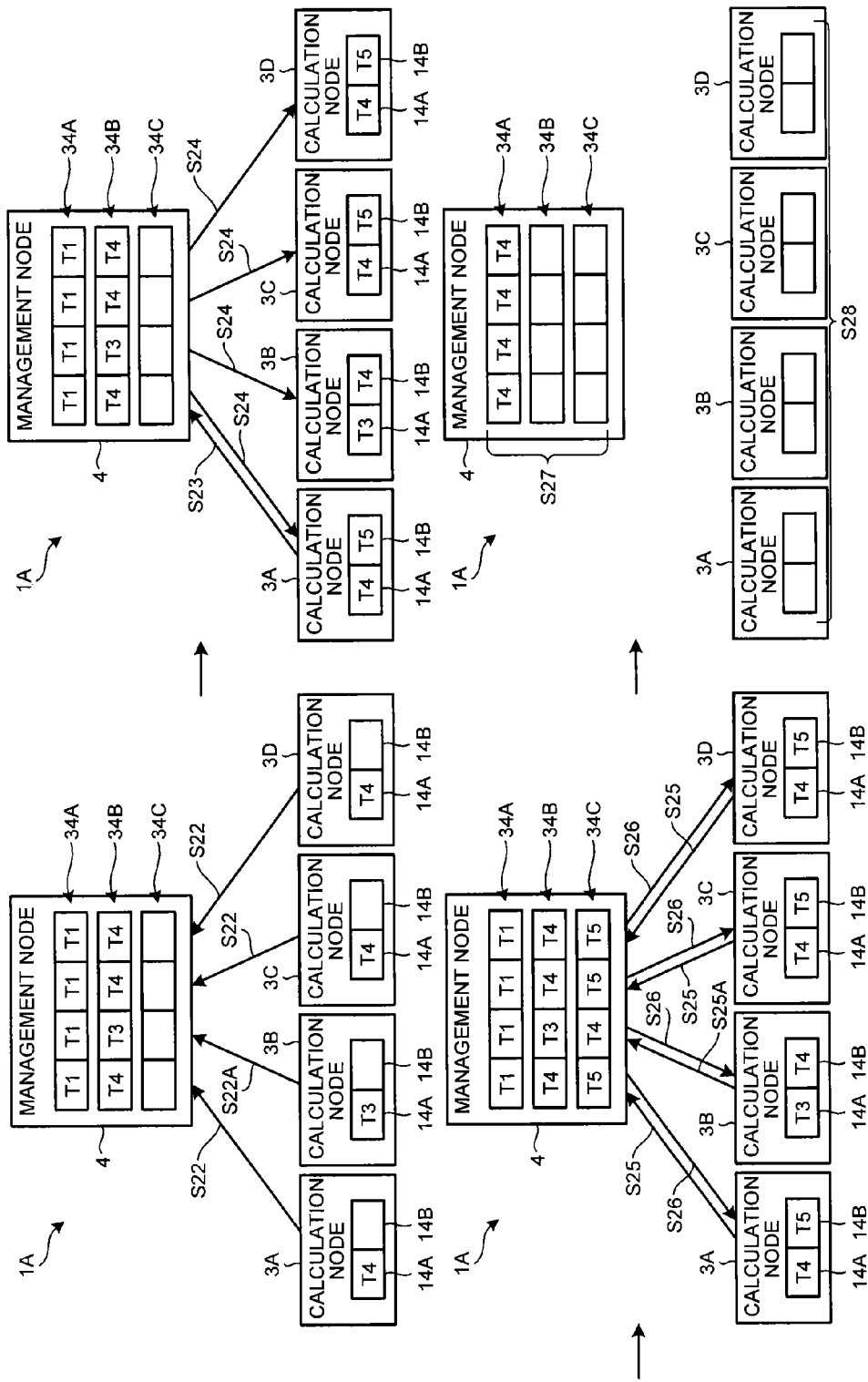
FIG. 8 is an illustration diagram illustrating an example of an operation transition for snapshot acquisition of a parallel computer.

Next, an operation of the parallel computer 1A according to the second embodiment will be described. FIGS. 6 to 8 are illustration diagrams illustrating an example of an operation transition for snapshot acquisition of the parallel computer 1A. Also, for the convenience of description, four calculation nodes 3 (3A to 3D) are provided, and the calculation node 3A is set to be a representative node. In FIG. 6, each of the calculation nodes 3A, 3C and 3D acquires job information according to the timing of the time belt number T1 from the job start command, and retains the job information in the calculation side retention unit 14. Also, the job information of the time belt number T1 is retained in the first retention region 14A of the calculation nodes 3A, 3C and 3D. Since the calculation node 3B cannot acquire the job information of the time belt number T1 due to the delay of reception of the job start command because of a certain factor, information is not retained in the first retention region 14A.

The calculation node 3A is the representative node. Therefore, when retaining the job information of the time belt number T1 in the calculation side retention unit 14, the calculation node 3A notifies the time belt number T1 to the management node 4 (step S11). When receiving the time belt number T1 of the calculation node 3A, the management node 4 requests the transmission of the job information of the time belt number T1 from all the calculation nodes 3 (step S12).

When receiving the transmission request for the job information of the time belt number T1, each calculation node 3 determines whether the job information of the time belt number T1 exists in the calculation side retention unit 14. When including the job information of the time belt number T1 in the calculation side retention unit 14, each of the calculation nodes 3A, 3C and 3D transmits the job information of the time belt number T1 to the management node 4 (step S13). Also, when not including the job information of the time belt number T1 in the calculation side retention unit 14 and not including one-generation-ago job information therein, the calculation node 3B transmits error information to the management node 4 (step S13A).

When receiving the job information of the time belt number T1 of the calculation nodes 3A, 3C and 3D, the management node 4 retains the job information of the time belt number T1 in the first retention region 34A corresponding to the calculation nodes 3A, 3C and 3D. Also, when receiving the error information of the calculation node 3B, the management node 4 does not retain information in the first retention region 34A corresponding to the calculation node 3B.

Next, each of the calculation nodes 3A, 3C and 3D acquires job information of the time belt number T2 according to the timing of the time belt number T2, and retains the job information in the second retention region 14B of the calculation side retention unit 14. Also, the calculation node 3B acquires job information of the time belt number T1 according to the timing of the time belt number T1, and retains the job information in the first retention region 14A of the calculation side retention unit 14.

The calculation node 3A is the representative node. Therefore, when retaining the job information of the time belt number T2 in the calculation side retention unit 14, the calculation node 3A notifies the time belt number T2 to the management node 4 (step S14). When receiving the time belt number T2, the management node 4 requests the transmission of the job information of the time belt number T2 from all the calculation nodes 3 (step S15).

In FIG. 7, when receiving the transmission request for the job information of the time belt number T2, each calculation node 3 determines whether the job information of the time belt number T2 exists in the calculation side retention unit 14. When including the job information of the time belt number T2 in the calculation side retention unit 14, each of the calculation nodes 3A, 3C and 3D transmits the job information of the time belt number T2 to the management node 4 (step S16). Also, when not including the job information of the time belt number T2 in the calculation side retention unit 14 and including one-generation-ago job information, that is, the time belt number T1 in the calculation side retention unit 14, the calculation node 3B notifies the job information of the time belt number T1 to the management node 4 (step S16A).

When receiving the job information of the time belt number T2 of the calculation nodes 3A, 3C and 3D, the management node 4 retains the job information of the time belt number T2 in the second retention region 34B corresponding to the calculation nodes 3A, 3C and 3D. Also, when receiving the job information of the time belt number T1 of the calculation node 3B, the management node 4 retains the job information of the time belt number T1 in the first retention region 34A corresponding to the calculation node 3B. As a result, the job information of the time belt number T1 of all the calculation nodes 3 is retained in the first retention region 34A. That is, a snapshot of the time belt number T1 is acquired.

When acquiring the snapshot of the time belt number T1, the management node 4 requests the clear of all the job information retained in the calculation side retention unit 14 of all the calculation nodes 3 from all the calculation nodes 3 (step S17). In addition, while retaining the job information of the time belt number T1 in the first retention region 34A, the management node 4 clears all the job information retained in the second retention region 34B and the third retention region 34C (step S18).

In addition, when receiving the clear request from the management node 4, each calculation node 3 clears all the job information retained in the first retention region 14A and the second retention region 14B (step S19).

Next, each of the calculation nodes 3A, 3C and 3D acquires job information according to the timing of the time belt number T4, and retains the job information of the time belt number T4 in the first retention region 14A. Likewise, the calculation node 3B acquires job information according to the timing of the time belt number T3, and retains the job information in the first retention region 14A.

The calculation node 3A is the representative node. Therefore, when retaining the job information of the time belt number T4 in the calculation side retention unit 14, the calculation node 3A notifies the time belt number T4 to the management node 4 (step S20). When receiving the time belt number T4 of the calculation node 3A, the management node 4 requests the transmission of the job information of the time belt number T4 from all the calculation nodes 3 (step S21).

In FIG. 8, when receiving the transmission request for the job information of the time belt number T4, each calculation node 3 determines whether the job information of the time belt number T4 exists in the calculation side retention unit 14. When including the job information of the time belt number T4 in the calculation side retention unit 14, each of the calculation nodes 3A, 3C and 3D transmits the job information of the time belt number T4 to the management node 4 (step S22). Also, when not including the job information of the time belt number T4 in the calculation side retention unit 14 and including one-generation-ago job information, that is, the job information of the time belt number T3 in the calculation side retention unit 14, the calculation node 3B notifies the job information of the time belt number T3 to the management node 4 (step S22A).

When receiving the job information of the time belt number T4 of the calculation nodes 3A, 3C and 3D, the management node 4 retains the job information of the time belt number T4 in the second retention region 34B corresponding to the calculation nodes 3A, 3C and 3D. Also, when receiving the job information of the time belt number T3 of the calculation node 3B, the management node 4 retains the job information of the time belt number T3 in the second retention region 34B corresponding to the calculation node 3B. Also, the job information of the time belt number T1 of all the calculation nodes 3 is being stored as a snapshot in the first retention region 34A.

Next, each of the calculation nodes 3A, 3C and 3D acquires job information according to the timing of the time belt number T5, and retains the job information of the time belt number T5 in the second retention region 14B. Likewise, the calculation node 3B acquires job information according to the timing of the time belt number T4, and retains the job information of the time belt number T4 in the second retention region 14B.

The calculation node 3A is the representative node. Therefore, when retaining the job information of the time belt number T5 in the calculation side retention unit 14, the calculation node 3A notifies the time belt number T5 to the management node 4 (step S23). When receiving the time belt number T5 of the calculation node 3A, the management node 4 requests the transmission of the job information of the time belt number T5 from all the calculation nodes 3 (step S24).

When receiving the transmission request for the job information of the time belt number T5, each calculation node 3 determines whether the job information of the time belt number T5 exists in the calculation side retention unit 14. When including the job information of the time belt number T5 in the calculation side retention unit 14, each of the calculation nodes 3A, 3C and 3D transmits the job information of the time belt number T5 to the management node 4 (step S25). Also, when not including the job information of the time belt number T5 in the calculation side retention unit 14 and including one-generation-ago job information, that is, the job information of the time belt number T4 in the calculation side retention unit 14, the calculation node 3B notifies the job information of the time belt number T4 to the management node 4 (step S25A).

When receiving the job information of the time belt number T5 of the calculation nodes 3A, 3C and 3D, the management node 4 retains the job information of the time belt number T5 in the third retention region 34C corresponding to the calculation nodes 3A, 3C and 3D. Also, when receiving the job information of the time belt number T4 of the calculation node 3B, the management node 4 retains the job information of the time belt number T4 in the third retention region 34C corresponding to the calculation node 3B. As a result, the job information of the time belt number T4 in the second retention region 34B corresponding to the calculation nodes 3A, 3C and 3D, and the job information of the time belt number T4 in the third retention region 34C corresponding to the calculation node 3B, and the job information of the time belt number T4 corresponding to all calculation nodes 3 are retained. That is, the snapshot of the time belt number T4 is acquired.

When acquiring the snapshot of the time belt number T4, the management node 4 requests the clear of all the job information retained in the calculation side retention unit 14 of all the calculation nodes 3 from all the calculation nodes 3 (step S26). The management node 4 overwrites/updates the job information of the time belt number T1 on the job information of the time belt number T4 in the first retention region 34A, and clears all the job information retained in the second retention region 34B and the third retention region 34C (step S27).

In addition, when receiving the clear request from the management node 4, each calculation node 3 clears all the job information retained in the first retention region 14A and the second retention region 14B (step S28). By repeating these processing operations, the latest snapshot can be retained in the first retention region 34A of the management node 4. As a result, even when detecting the snapshot presentation request from the user terminal, the management node 4 can present the latest snapshot retained in the first retention region 34A.

Figure 9:
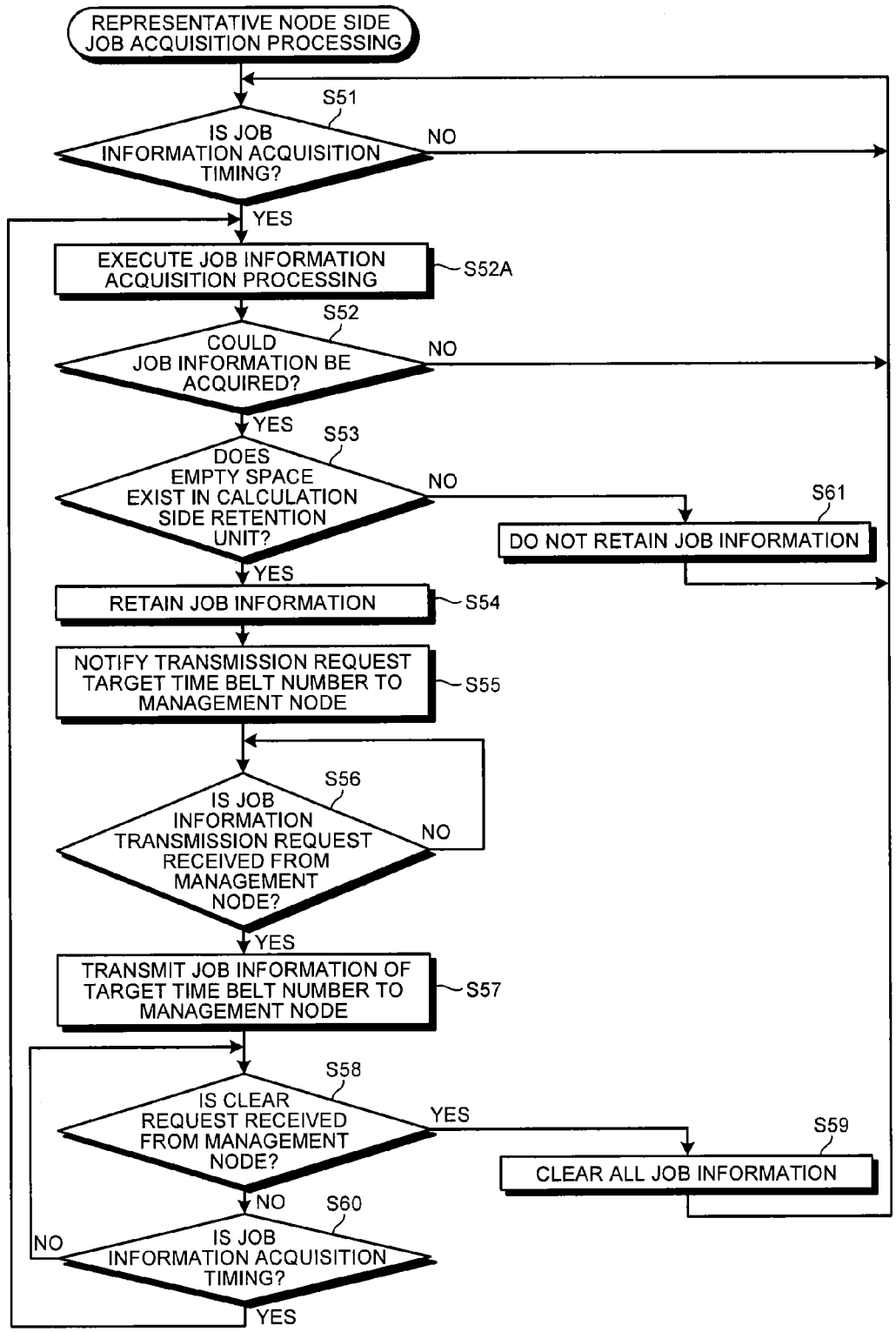
FIG. 9 is a flow chart illustrating an internal processing operation of a representative node for job acquisition processing of a representative node side.

Next, the job acquisition processing of the calculation node 3A being the representative node will be described. FIG. 9 is a flow chart illustrating a processing operation of the calculation node 3A for job acquisition processing of the representative node side. In FIG. 9, the timing detection unit 21 in the job information processing control unit 12 of the calculation node 3A determines whether the job information acquisition timing is detected (step S51). When the job information acquisition timing is detected (Yes in step S51), the acquisition processing unit 22 in the job information processing control unit 12 executes job information acquisition processing (step S52A) and determines whether the own job information could be acquired (step S52).

When the own job information could be acquired (Yes in step S52), the calculation side retention control unit 23 in the job information processing control unit 12 determines whether an empty space exists in the calculation side retention unit 14 (step S53). When an empty space exists in the calculation side retention unit 14 (Yes in step S53), the calculation side retention control unit 23 retains the job information of the time belt number in the calculation side retention unit 14 (step S54).

When the job information of the time belt number is retained in the calculation side retention unit 14, the information transmission unit 24 in the job information processing control unit 12 notifies the time belt number as a time belt number of a transmission request target to the management node 4 (step S55). The calculation side retention control unit 23 determines whether the transmission request for the job information designating the time belt number of the transmission request target is received from the management node 4 (step S56). When the transmission request for the job information is received (Yes in step S56), the calculation side retention control unit 23 transmits the job information about the time belt number of the transmission request retained in the calculation side retention unit 14 to the management node 4 (step S57).

The calculation side retention control unit 23 determines whether the clear request is received from the management node 4 (step S58). When the clear request is received from the management node 4 (Yes in step S58), the calculation side retention control unit 23 clears all the job information retained in the calculation side retention unit 14 (step S59), and proceeds to step S51 to determine whether the job information acquisition timing is detected.

Also, when the clear request is not received (No in step S58), the calculation side retention control unit 23 determines whether the job information acquisition timing is detected (step S60). When the job information acquisition timing is not detected (No in step S60), the calculation side retention control unit 23 proceeds to step S58 to determine whether the clear request is received. When the job information acquisition timing is detected (Yes in step S60), the calculation side retention control unit 23 proceeds to step S52A to execute job information acquisition processing.

Also, when the job information acquisition timing is not detected (No in step S51), the timing detection unit 21 proceeds to step S51 to continue to monitor the job information acquisition timing. Also, the job information could not be acquired (No in step S52), the acquisition processing unit 22 proceeds to step S51 to detect the job information acquisition timing.

Also, when an empty space does not exist in the calculation side retention unit 14 (No in step S53), the calculation side retention control unit 23 does not retain the job information of the time belt number in the calculation side retention unit 14 (step S61), and proceeds to step S51 to detect the job information acquisition timing.

Also, when the job information transmission request is not received (No in step S56), the calculation side retention control unit 23 proceeds to step S56 to continue to monitor the job information transmission request. Also, since step S56 is processing executed by the representative node, the time belt number of the transmission request target urging the transmission request from the management node 4 is notified. Therefore, in the normal case, the transmission request is necessarily received from the management node 4.

In the job acquisition processing of the representative node side illustrated in FIG. 9, when acquiring the job information according to the acquisition timing common to the calculation nodes, the representative node determines whether an empty space exists in the calculation side retention unit 14. When an empty space exists in the calculation side retention unit 14, the job information is retained in the calculation side retention unit 14 in association with the time belt number identifying the acquisition timing. As a result, the representative node can retain the job information corresponding to two generations in association with the time belt number.

In the job acquisition processing of the representative node side, when the job information is retained in the calculation side retention unit 14 in association with the time belt number, the time belt number is notified to the management node 4 as the transmission request target. As a result, the representative node can report the time belt number of the job information of the transmission request target to the management node 4.

In the job acquisition processing of the representative node side, according to the transmission request for job information of a designated time belt number from the management node 4, the job information of the designated time belt number is transmitted to the management node 4. As a result, the representative node can transmit the job information of the transmission request target to the management node 4.

In the job acquisition processing of the representative node side, when the clear request is received from the management node 4, all the job information retained in the calculation side retention unit 14 is cleared. As a result, the representative node can retain new job information in the calculation side retention unit 14 so that the latest snapshot is acquired by the management node 4.

Figure 10:
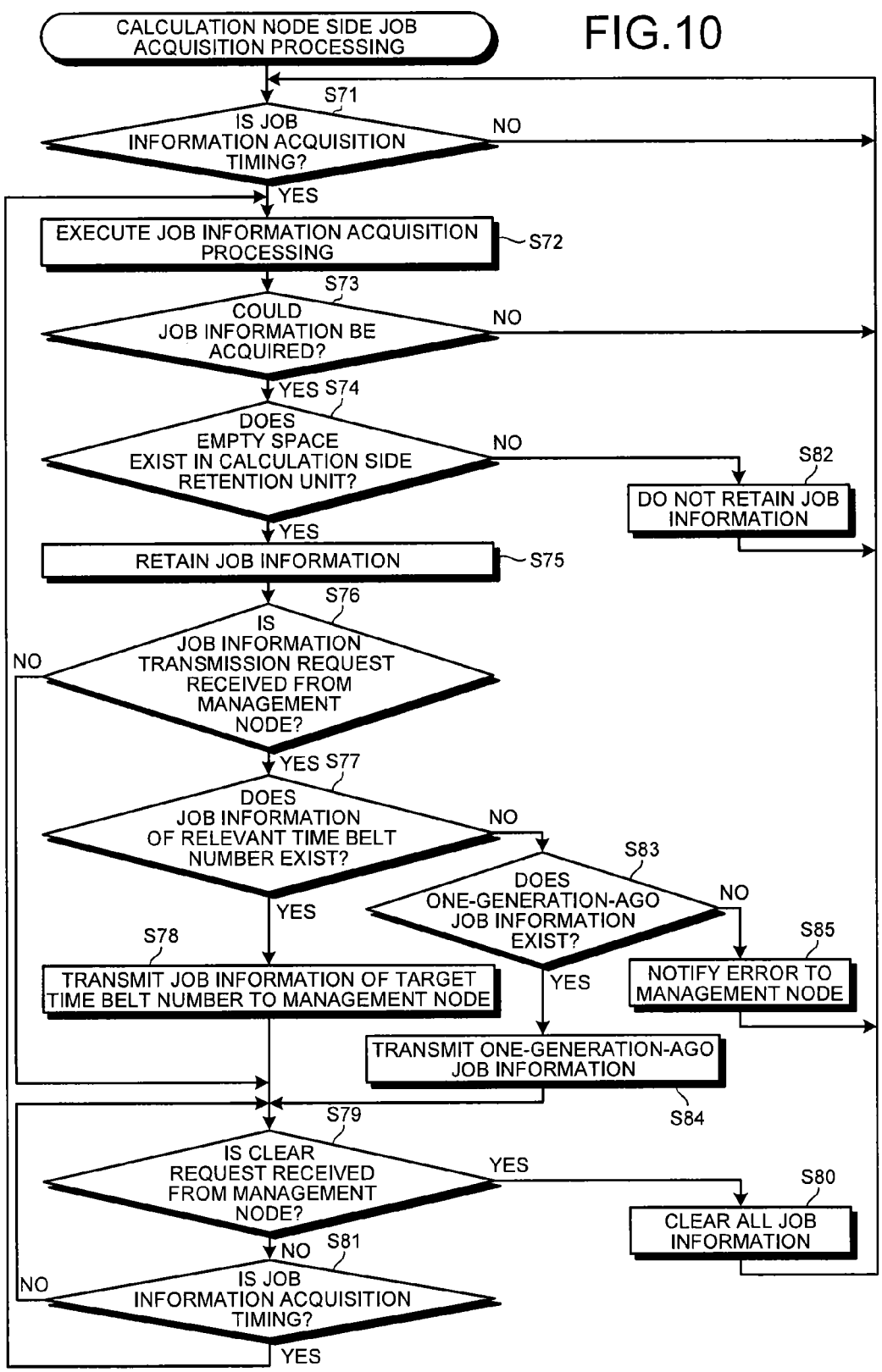
FIG. 10 is a flow chart illustrating an internal processing operation of a calculation node for job acquisition processing of a calculation node side.

Next, the job acquisition processing of the calculation nodes 3 other than the representative node will be described. FIG. 10 is a flow chart illustrating a processing operation of the calculation node 3 for job acquisition processing of the calculation node side. In FIG. 10, the timing detection unit 21 in the job information processing control unit 12 of the calculation node 3 determines whether the job information acquisition timing is detected (step S71). When the job information acquisition timing is detected (Yes in step S71), the acquisition processing unit 22 executes job information acquisition processing (step S72) and determines whether the own job information could be acquired (step S73).

When the own job information could be acquired (Yes in step S73), the calculation side retention control unit 23 determines whether an empty space exists in the calculation side retention unit 14 (step S74). When an empty space exists in the calculation side retention unit 14 (Yes in step S74), the calculation side retention control unit 23 retains the job information of the time belt number in the calculation side retention unit 14 (step S75).

The calculation side retention control unit 23 determines whether the transmission request for the job information designating the time belt number of the transmission request target is received from the management node 4 (step S76). When the transmission request for the job information is received (Yes in step S76), the calculation side retention control unit 23 determines whether the job information of the time belt number of the transmission request exists in the calculation side retention unit 14 (step S77).

When the job information of the time belt number of the transmission request exists in the calculation side retention unit 14 (Yes in step S77), the information transmission unit 24 transmits the job information of the time belt number of the transmission request to the management node 4 (step S78). The calculation side retention control unit 23 determines whether the clear request is received from the management node 4 (step S79). When the clear request is received (Yes in step S79), the calculation side retention control unit 23 clears all the job information retained in the calculation side retention unit 14 (step S80), and proceeds to step S71 to determine whether the job information acquisition timing is detected.

Also, when the clear request is not received (No in step S79), the calculation side retention control unit 23 determines whether the job information acquisition timing is detected (step S81). When the job information acquisition timing is not detected (No in step S81), the calculation side retention control unit 23 proceeds to step S79 to determine whether the clear request is received. When the job information acquisition timing is detected (Yes in step S81), the calculation side retention control unit 23 proceeds to step S72 to execute job information acquisition processing.

Also, when the job information acquisition timing is not detected (No in step S71), the timing detection unit 21 proceeds to step S71 to continue to monitor the job information acquisition timing. Also, the job information could not be acquired (No in step S73), the acquisition processing unit 22 proceeds to step S71 to detect the job information acquisition timing.

Also, when an empty space does not exist in the calculation side retention unit 14 (No in step S74), the calculation side retention control unit 23 does not retain the job information of the time belt number in the calculation side retention unit 14 (step S82), and proceeds to step S71 to detect the job information acquisition timing.

Also, when the job information transmission request is not received (No in step S76), the calculation side retention control unit 23 proceeds to step S79 to determine whether the clear request is received.

Also, when the job information of the time belt number of the transmission request does not exist in the calculation side retention unit 14 (No in step S77), the calculation side retention control unit 23 determines whether job information one generation before the time belt number exists in the calculation side retention unit 14 (step S83). Also, when the time belt number of the transmission request is, for example, T3, the one-generation-ago job information corresponds to the job information of the time belt number T2. When the job information one generation before the time belt number exists in the calculation side retention unit 14 (Yes in step S83), the calculation side retention control unit 23 transmits the one-generation-ago job information to the management node 4 (step S84), and proceeds to step S79 to determine whether clear request is received.

Also, when the job information one generation before the time belt number does not exist in the calculation side retention unit 14 (No in step S83), the calculation side retention control unit 23 transmits error information to the management node 4 (step S85), and proceeds to step S71 to determine whether the job information acquisition timing is detected.

In the job acquisition processing of the calculation node side illustrated in FIG. 10, when acquiring the job information according to the acquisition timing common to the calculation nodes, the calculation node 3 determines whether an empty space exists in the calculation side retention unit 14. When an empty space exists in the calculation side retention unit 14, the job information is retained in the calculation side retention unit 14 in association with the time belt number identifying the acquisition timing. As a result, the calculation node 3 can retain the job information corresponding to two generations in association with the time belt number.

In the job acquisition processing of the calculation node side, according to the transmission request for job information of a designated time belt number from the management node 4, it is determined whether the job information of the designated time belt number exists in the calculation side retention unit 14. When the job information of the designated time belt number exists in the calculation side retention unit 14, the job information of the time belt number is transmitted to the management node 4. As a result, the calculation node 3 can transmit the job information of the designated time belt number of the transmission request to the management node 4.

In the job acquisition processing of the calculation node side, when the job information of the designated time belt number does not exist in the calculation side retention unit 14, it is determined whether one-generation-ago job information exists in the calculation side retention unit 14. When one-generation-ago job information exists in the calculation side retention unit 14, the one-generation-ago job information is transmitted to the management node 4. As a result, the calculation node 3 can also transmit the one-generation-ago job information to the management node 4 in order to absorb a gap between the calculation nodes 3 caused by, for example, the transmission delay of the clear request.

In the job acquisition processing of the calculation node side, when one-generation-ago job information does not exist in the calculation side retention unit 14, error information is transmitted to the management node 4. As a result, the calculation node 3 can report the nonexistence of transmittable job information to the management node 4.

In the job acquisition processing of the calculation node side, when the clear request is received from the management node 4, all the job information retained in the calculation side retention unit 14 is cleared. As a result, the calculation node 3 can retain new job information in the calculation side retention unit 14 so that the latest snapshot is acquired by the management node 4.

Figure 11:
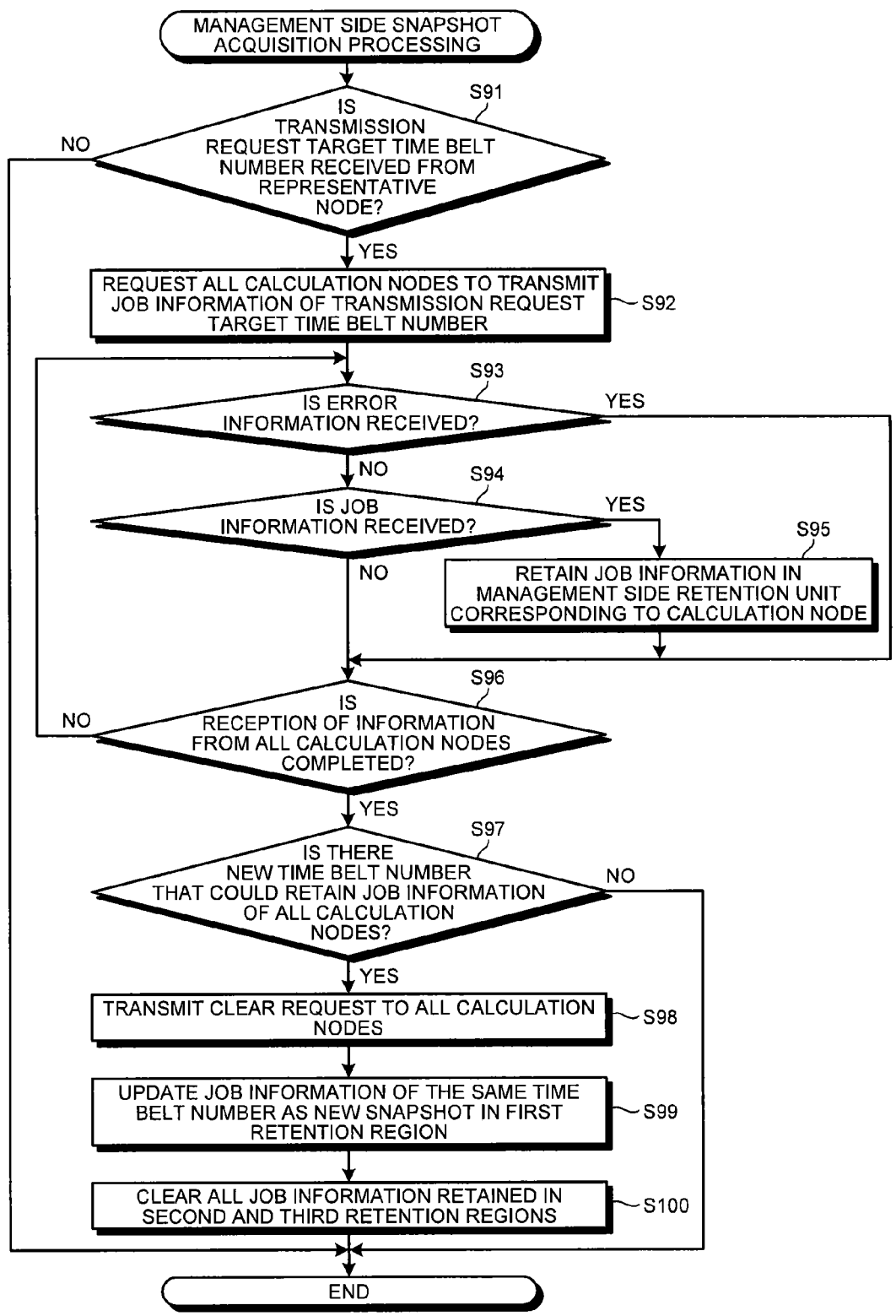
FIG. 11 is a flow chart illustrating an internal processing operation of a management node for job acquisition processing of a management node side.

Next, an operation of the management node 4 will be described. FIG. 11 is a flow chart illustrating a processing operation of the management node 4 for job acquisition processing of the management node side. In FIG. 11, the snapshot processing control unit 32 of the management node 4 determines whether the time belt number of the transmission request target is received from the representative calculation node 3A (step S91). When the time belt number of the transmission request target is received (Yes in step S91), the transmission request unit 41 of the snapshot processing control unit 32 requests the transmission of job information about the time belt number of the transmission request target from all the calculation nodes 3 (step S92).

The received information identification unit 42 in the snapshot processing control unit 32 determines whether the information received from each calculation node 3 is error information (step S93). When the information received from each calculation node 3 is not error information (No in step S93), the received information identification unit 42 determines whether the received information is job information (step S94). When the received information is job information (Yes in step S94), the management side retention control unit 45 in the snapshot processing control unit 32 retains the job information in the management side retention unit 34 corresponding to the relevant calculation node 3 (step S95). The received information identification unit 42 determines whether the reception of information from all the calculation nodes 3 receiving the transmission request is completed (step S96).

When the reception of information from all the calculation nodes 3 is not completed (No in step S96), the received information identification unit 42 determines that there is the received information that is not yet identified, and proceeds to step S93 to determine whether the received information is error information. When the reception of information from all the calculation nodes 3 is completed (Yes in step S96), the retention region monitoring unit 43 in the snapshot processing control unit 32 determines whether there is a new time belt number that could retain the job information of all the calculation nodes 3, based on the information retained in the management side retention unit 34 (step S97).

When there is a new time belt number that could retain the job information of all the calculation nodes 3 (Yes in step S97), the retention region monitoring unit 43 determines that the snapshot of the same time belt number is newly acquired. In addition, the transmission request unit 41 determines that the snapshot of the same time belt number is newly acquired, and requests the clear of the job information retained in the management side retention unit 34 from all the calculation nodes 3 (step S98).

The management side retention control unit 45 updates/registers the job information of the same time belt number of all the calculation nodes 3, which could be newly retained, as a new snapshot in the first retention region 34A (step S99). In addition, the management side retention control unit 45 clears all the job information of the respective calculation nodes 3 retained in the second retention region 34B and the third retention region 34C (step S100), and ends the processing operation of FIG. 11.

When the time belt number of the transmission target is not received (No in step S91), the snapshot processing control unit 32 ends the processing operation of FIG. 11. Also, when the received information is error information (Yes in step S93), the received information identification unit 42 identifies the received information from the calculation node 3, and proceeds to step S96 to determine whether the identification of the received information from all the calculation nodes 3 is completed.

When there is no new time belt number that could retain the job information of all the calculation nodes 3 (No in step S97), the retention region monitoring unit 43 ends the processing operation of FIG. 11.

In the snapshot acquisition processing of the management node side illustrated in FIG. 11, when receiving the time belt number of the transmission request target from the representative node, the management node 4 requests the transmission of the job information of the time belt number of the transmission request target from each calculation node 3. As a result, according to the time belt number of the transmission request target from the representative node, the management node 4 can request the transmission of the job information about the designated time belt number from each calculation node 3.

In the snapshot acquisition processing of the management node side, the management node 4 determines whether the received information from each calculation node 3 with respect to the transmission request is job information. When the received information is job information, the information is determined as job information of the designated time belt number or the one-generation-ago time belt number and the job information is retained in association with the relevant calculation node 3 in the management side retention unit 34. As a result, the management node 4 can retain the job information of each calculation node 3 corresponding to three generations in the management side retention unit 34.

In the snapshot acquisition processing of the management node side, when a new time belt number that could retain the job information of all the calculation nodes 3 exists in the management side retention unit 34, the management node 4 determines that the snapshot of the same time belt number is newly acquired. In addition, the management node 4 determines that the snapshot of the same time belt number is newly acquired, and requests the clear of the job information retained in the management side retention unit 34 from all the calculation nodes 3. The management node 4 updates/registers the job information of the same time belt number of all the calculation nodes 3, which could be newly retained, as a new snapshot in the first retention region 34A, and clears the job information of each calculation node 3 retained in the second retention region 34B and the third retention region 34C.

As a result, since the snapshot of the job information of the same time belt number is retained in the first retention region 34A, the management node 4 can present the latest snapshot to the user. In addition, by clearing the job information of the second retention region 34B and the third retention region 34C, the management node 4 can use the second retention region 34B and the third retention region 34C as a temporary job information retention region.

In the second embodiment, the calculation node 3 acquires the job information according to the period timing common to the calculation nodes, and retains the acquired job information in the calculation side retention unit 14 in association with the time belt number identifying the period timing at which the job information is acquired. In addition, in the second embodiment, when receiving the job information from each calculation node 3 according to the transmission request, the management node 4 retains the received job information in the management side retention unit 34. In the second embodiment, when detecting job information of the same time belt number about the calculation nodes 3 in the management side retention unit 34, the management node 4 retains the job information of the same time belt number as a snapshot. In addition, in the second embodiment, when the job information of the same time belt number is retained as a snapshot, the job information other than the job information of the same time belt number retained in the management side retention unit 34 is cleared and all of the job information retained in the calculation side retention unit 14 is cleared. As a result, since the job information is managed in association with the time belt number of the period timing at which the job information is acquired, an accurate snapshot of the job information between the calculation nodes 3 can be secured.

In the second embodiment, the calculation side retention unit 14 is provided with a retention region capable of retaining job information corresponding to two generations, and the management side retention unit 34 is provided with a retention region capable of retaining job information corresponding to three generations. As a result, for example, the job information clear timing caused by the delay of transmission of the clear request from the management node 4 is different in each calculation node 3. Accordingly, the impossibility of collecting the job information of each calculation node 3 by the management node 4 can be avoided, and the acquisition of a snapshot can be secured.

In the second embodiment, one of the plurality of calculation nodes 3 is used as a representative node, and the management node 4 starts the transmission request for the job information associated with the time belt information when the time belt number of the transmission request target is notified from the representative node to the management node 4. As a result, since one representative node is sufficient, the communication load in the acquisition of a snapshot can be reduced.

Also, although four calculation nodes 3 are provided in the second embodiment, the number of calculation nodes 3 is not limited thereto. Also, although one of the plurality of calculation nodes 3 is used as the representative node in the second embodiment, the number of calculation nodes used as the representative node is not limited thereto. Also, although one of the plurality of calculation nodes 3 is used as the representative node in the second embodiment, each calculation node 3 may be used as the representative node.

Also, in the second embodiment, the calculation side retention unit 14 is provided with a retention region retaining job information corresponding to two generations, and the management side retention unit 34 is provided with a retention region retaining job information corresponding to three generations. However, the calculation side retention unit 14 may be provided with a retention region retaining job information corresponding to three generations, and the management side retention unit 34 may be provided with a retention region retaining job information corresponding to four generations.

Also, in the second embodiment, the time in each calculation node 3 taken until the execution of job information clearing after arrival of the clear request from the management node 4 at each calculation node 3 is measured, and the maximum gap time between the calculation nodes 3 is calculated based on the measurement result. The maximum gap time is assumed to be sufficiently shorter than the time belt interval time, and the calculation side retention unit 14 is provided with a retention region retaining job information corresponding to two generations.

On the other hand, in the case where the maximum time difference is longer than the time belt interval time, when the condition of "(n times of the time belt interval time)<(maximum time difference)≤((n+1) times of time belt interval time)" is satisfied, the calculation side retention unit 14 is provided with a retention region retaining job information corresponding to (n+1) generations. In addition, the management side retention unit 34 is provided with a retention region retaining job information corresponding to (n+3) generations. For example, when n=1, the calculation side retention unit 14 is provided with a retention region retaining job information corresponding to three generations, and the management side retention unit 34 is provided with a retention region retaining job information corresponding to four generations. Also, when n=2, the calculation side retention unit 14 is provided with a retention region retaining job information corresponding to four generations, and the management side retention unit 34 is provided with a retention region retaining job information corresponding to five generations.

Figure 12:
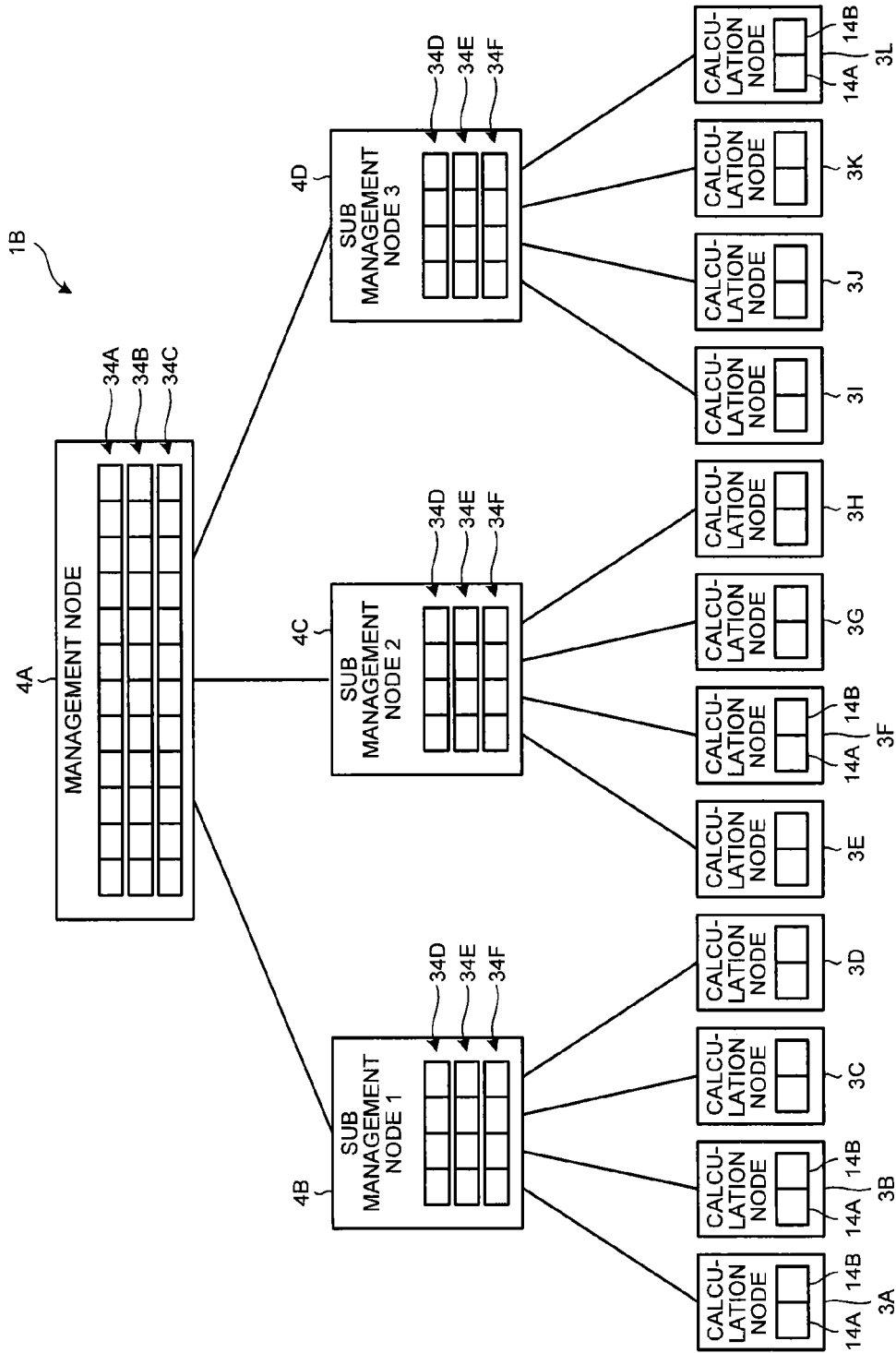
FIG. 12 is an illustration diagram illustrating a parallel computer according to another embodiment.

Also, although a two-stage parallel computer 1 is provided between the management node 4 and the calculation node 3 in the second embodiment, a multi-stage parallel computer may be provided between the calculation node 3 and the management node 4. FIG. 12 is an illustration diagram illustrating a three-stage parallel computer.

A parallel computer 1B illustrated in FIG. 12 includes 12 calculation nodes 3A to 3L, three sub management nodes 4B to 4D, and one management node 4A. The sub management node 4B relays and manages four calculation nodes 3A to 3D. In addition, the sub management node 4C relays and manages four calculation nodes 3E to 3H. In addition, the sub management node 4D relays and manages four calculation nodes 31 to 3L. In addition, the management node 4A manages three sub management nodes 4B to 4D.

The calculation side retention unit 14 of each of the calculation nodes 3A to 3L includes a first retention region 14A and a second retention region 14B. Each of the sub management nodes 4B to 4D includes a first retention region 34D, a second retention region 34E and a third retention region 34F that retain job information of four calculation nodes corresponding to three generations.

In addition, the management side retention unit 34 of the management node 4A includes a first retention region 34A, a second retention region 34B and a third retention region 34C that retain job information of the same time belt number of 12 calculation nodes 3A to 3L corresponding to three generations.

Each of the calculation nodes 3A to 3L acquires job information of the common period timing from a job start command, and retains the job information in the calculation side retention unit 14. The sub management nodes 4B, 4C and 4D summarize and collect the job information from the managed calculation nodes 3A to 3D (3E to 3H and 3I to 3L). Each of the sub management nodes 4B, 4C and 4D collects the job information and retains the collected job information. In addition, the sub management nodes 4B, 4C and 4D summarize and transmit the job information of the calculation nodes 3A to 3D (3E to 3H and 3I to 3L) to the management node 4A.

That is, the management node 4A does not separately communicate with the calculation nodes 3A to 3L, but collects the job information of the calculation nodes 3A to 3L through communication with the sub management nodes 4B, 4C and 4D. As a result, since the management node 4A collects the job information of the calculation nodes 3A to 3L through communication with the sub management nodes 4B, 4C and 4D, the number of times of communication and the communication load can be reduced.

Although the example of FIG. 12 illustrates a three-layer structure of the management node 4A, the sub management nodes 4B to 4D and the calculation nodes 3A to 3L, the present invention is not limited to the three-layer structure but may include a hierarchical structure of four or more layers.

Also, the respective elements of the respective units illustrated do not necessarily require a physical configuration as illustrated. That is, the details of distribution/integration of the respective units are not limited to the illustrated embodiments, and all or some of the respective units may be functionally or physically distributed/integrated in random units according to various loads or use conditions.

In addition, all or some of various processing functions performed by the respective devices may be executed on a CPU (Central Processing Unit) (or microcomputer such as MPU (Micro Processing Unit) or MCU (Micro Controller Unit)). Also, needless to say, all or some of the various processing functions may be executed on a program interpreted and executed by a CPU (or microcomputer such as MPU or MCU), or on hardware based on wired logic.

Figure 13:
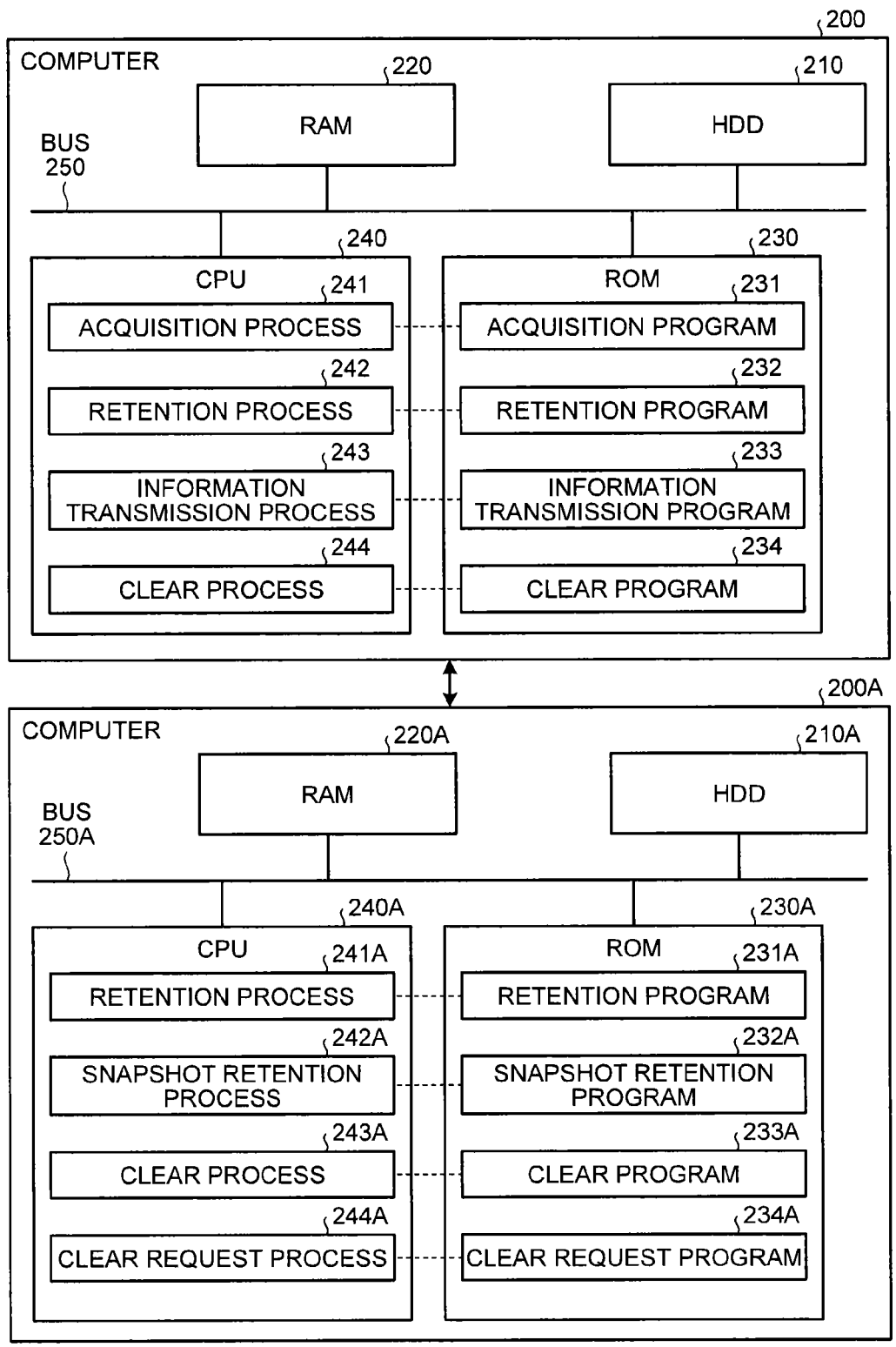
FIG. 13 is an illustration diagram illustrating a computer executing a job information acquisition program of a parallel computer.
Figure 14:
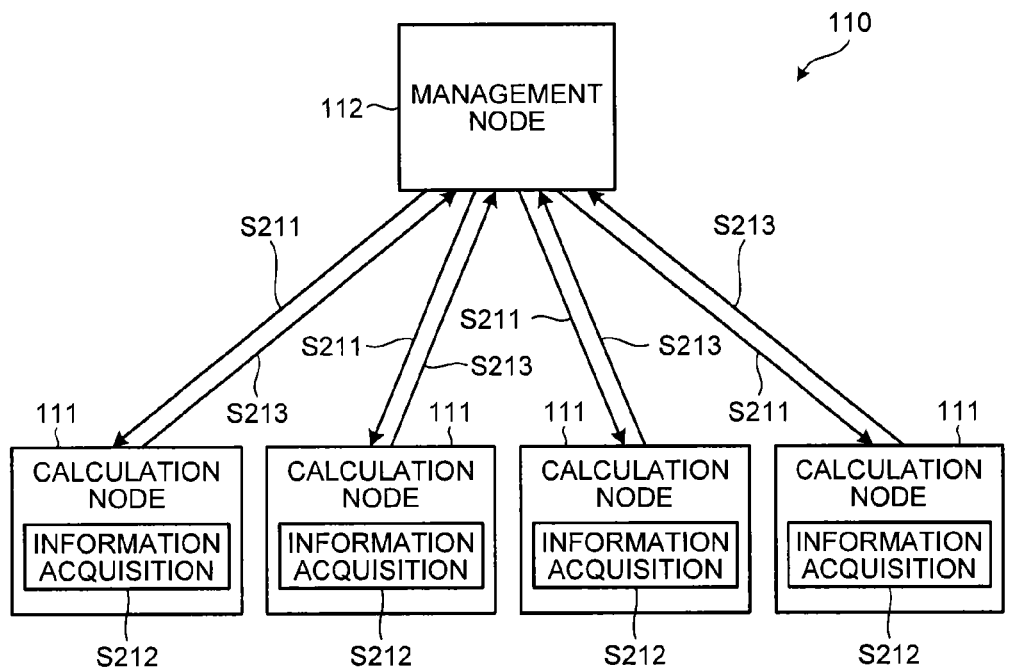
FIG. 14 is an illustration diagram illustrating a snapshot acquisition method for a parallel computer.
Figure 15:
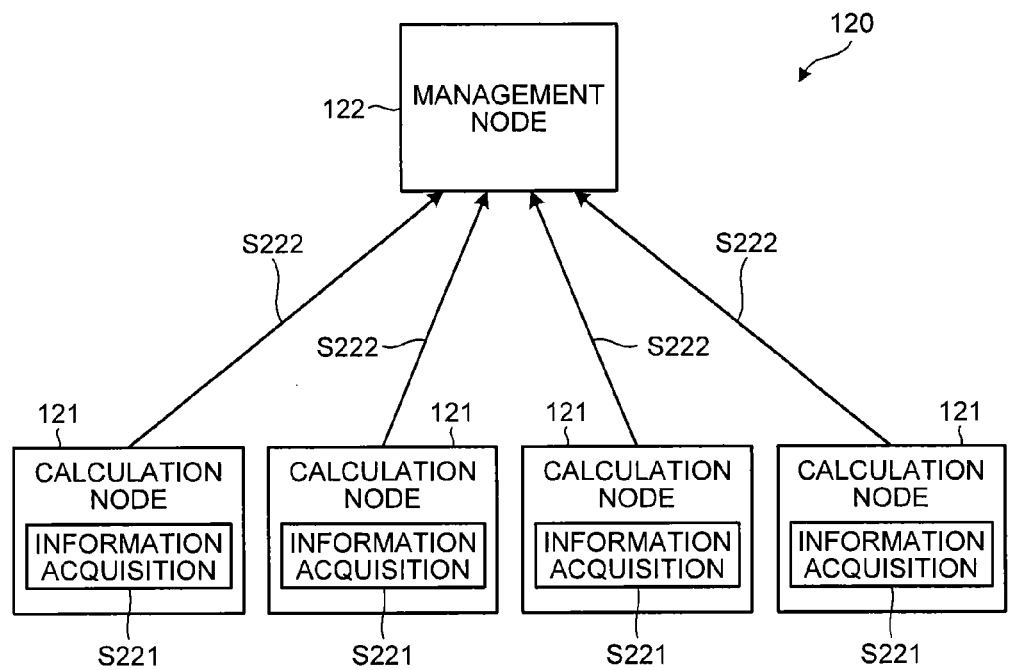
FIG. 15 is an illustration diagram illustrating another snapshot acquisition method for a parallel computer.

However, the various processing described in the present embodiment can be implemented by executing a prepared program on a computer. Therefore, an example of a computer executing a program having the same function as the above embodiment will be described below with reference to FIG. 13. FIG. 13 is an illustration diagram illustrating a computer executing a job information acquisition program of a parallel computer.

A computer 200 illustrated in FIG. 13 includes a HDD (Hard Disk Drive) 210, a RAM (Random Access Memory) 220, a ROM (Read Only Memory) 230, and a CPU 240 that are connected through a bus 250.

A job information acquisition program of the calculation node side performing the same function as the above embodiment is pre-stored in the ROM 230. As illustrated in FIG. 13, the job information acquisition program of the calculation node side includes an acquisition program 231, a retention program 232, an information transmission program 233, and a clear program 234. Also, like the respective elements of the calculation node 50 illustrated in FIG. 1, the programs 231 to 234 may be appropriately integrated or distributed.

The CPU 240 reads the programs 231 to 234 from the ROM 230 and executes the same. As illustrated in FIG. 13, the respective programs 231 to 234 function as an acquisition process 241, a retention process 242, an information transmission process 243, and a clear process 244.

Also, a computer 200A includes an HDD 210A, a RAM 220A, a ROM 230A, and a CPU 240A that are connected through a bus 250A.

A job information acquisition program of the management node side performing the same function as the above embodiment is pre-stored in the ROM 230A. As illustrated in FIG. 13, the job information acquisition program of the management node side includes a retention program 231A, a snapshot retention program 232A, a clear program 233A, and a clear request program 234A. Also, like the respective elements of the management node 60 illustrated in FIG. 1, the programs 231A to 234A may be appropriately integrated or distributed.

The CPU 240A reads the programs 231A to 234A from the ROM 230A and executes the same. As illustrated in FIG. 13, the respective programs 231A to 234A function as a retention process 241A, a snapshot retention process 242A, a clear process 243A, and a clear request process 244A.

According to the period timing common to the calculation nodes, the CPU 240 acquires job information about a calculation job handled by the calculation node. In addition, the CPU 240 retains the job information in the retention unit of the RAM 220, which enables the retention of job information corresponding to a predetermined number of periods, in association with the identification number identifying the period timing at which the job information is acquired. In addition, when receiving the transmission request for the job information about the designated identification number from the management node, the CPU 240 transmits the job information about the designated identification number to the management node when the job information about the designated identification number exists in the retention unit. Also, when the job information about the designated identification number does not exist in the retention unit and the job information of an identification number just before the designated identification number exists therein, the CPU 240 transmits the job information of the identification number to the management node.

Also, when receiving the job information from each calculation node according to the transmission request, the CPU 240A retains the received job information in the RAM 220A that enables the retention of job information corresponding to a predetermined number of periods with respect to each calculation node. In addition, when detecting the job information of the same identification number about the calculation node in the retention unit, the CPU 240A retains the received job information of the same identification number as a snapshot. In addition, when the job information of the same identification number is retained as a snapshot, the CPU 240A clears job information other than the job information of the same identification number retained in the retention unit of the RAM 220A. In addition, when the job information of the same identification number is retained as a snapshot, the CPU 240A transmits a clear request to each calculation node.

When receiving the clear request from the management node, the CPU 240 clears all the job information retained in the retention unit of the RAM 220. As a result, since the job information is managed in association with the identification number of the period timing at which the job information is acquired, an accurate snapshot of the job information between the calculation nodes can be secured. Also, the impossibility of collecting the job information of each calculation node by the management node due to the different job information clear timing caused by, for example, the transmission delay of the clear request from the management node can be avoided, and the acquisition of a snapshot can be secured.

In one aspect, the job information of the same timing about a job that is being executed in each calculation node of the parallel computer can be acquired.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A parallel computer comprising:
a plurality of calculation nodes that execute a calculation job distributively in parallel; and
a management node that manages the plurality of calculation nodes,
wherein one of the calculation nodes comprises:
a processor configured to execute a first process including:
acquiring job information about a calculation job handled by the one of the calculation nodes according to a period timing common to the calculation nodes;
retaining the job information in a retention unit of the one of the calculation nodes in association with an identification number identifying the period timing at which the job information is acquired at the acquiring, and clearing all the job information retained in the retention unit when a clear request is received from the management node; and
transmitting, when a transmission request for the job information about a designated identification number is received from the management node, the job information to the management node in a case where the job information exists in the retention unit, and transmitting other job information about an identification number just before the designated identification number to the management node in a case where the job information does not exist in the retention unit and the other job information exists in the retention unit, the management node comprises:
a processor configured to execute a second process including:
retaining the job information in a retention unit of the management node when the job information is received from each of the calculation nodes according to the transmission request, retains, as a snapshot, job information including the same identification number as the identification number of other job information in a case where the job information is detected in the retention unit, and clearing job information other than the job information retained in the retention unit of the management node; and
transmitting the clear request to each of the calculation nodes when the job information of the same identification number is retained as a snapshot,
the retention unit of the calculation node comprises a retention region enabling retention of job information corresponding to a plurality of periods, and
the retention unit of the management node comprises a retention region enabling retention of the job information corresponding to the plurality of periods with respect to each of the calculation nodes, wherein
the retention unit of each of the calculation nodes is provided with a first retention region and a second retention region as retention regions for retaining the job information corresponding to two time belts in order to absorb a gap corresponding to one time belt.

2. The parallel computer according to claim 1, wherein time in each of the calculation nodes taken until execution of job information clearing after arrival of the clear request from the management node at each of the calculation nodes is measured and the maximum gap time between the calculation nodes is calculated based on the measurement result, and
when the condition of "(n times of the interval time of the period timing) <(the maximum gap time)≤((n +1) times of the interval time of the period timing)" is satisfied, the retention unit of the management node comprises a retention region retaining job information corresponding to (n +3) periods and the retention unit of the calculation node comprises a retention region retaining job information corresponding to (n +2) periods.

3. The parallel computer according to claim 1, wherein the acquiring includes starting a timer time measurement operation according to an execution start timing of the calculation job, and detecting the period timing based on the measured time.

4. The parallel computer according to claim 1, wherein the second process further includes requesting transmission of the job information about the designated identification number from each of the calculation nodes according to a predetermined signal.

5. The parallel computer according to claim 4, wherein
one of the plurality of calculation nodes is set to be a representative node, and
when the retention unit of the representative node acquires job information, the representative node sets the predetermined signal to be a signal notifying the identification number of the acquired job information to the management node.

6. The parallel computer according to claim 4, wherein, when the retention unit of a calculation node acquires job information, the calculation node sets the predetermined signal to be a signal notifying the identification number of the acquired job information to the management node.

7. A computer-readable recording medium having stored therein a job information acquisition program for a parallel computer including a plurality of calculation nodes executing a calculation job distributively in parallel and a management node managing the plurality of calculation nodes, the job information acquisition program causing the parallel computer to execute a process comprising:

acquiring job information about a calculation job handled by each of the calculation nodes according to a period timing common to the calculation nodes;

retaining the job information in a retention unit of each of the calculation nodes, which enables retention of job information corresponding to a plurality of periods, in association with an identification number identifying the period timing at which the job information is acquired;

when a transmission request for the job information about a designated identification number is received from the management node, transmitting job information to the management node in a case where the job information exists in the retention unit, and transmitting other job information about an identification number just before the designated identification number to the management node in a case where the job information does not exist in the retention unit and the other job information exists in the retention unit;

retaining the job information in a retention unit of the management node, which enables retention of job information corresponding to a plurality of periods with respect to each of the calculation nodes, when the job information is received from each of the calculation nodes according to the transmission request;

retaining, as a snapshot, job information including the same identification number as the identification number of other job information when the job information is detected in the retention unit of the management node;

clearing job information other than the job information of the same identification number retained in the retention unit of the management node;

transmitting a clear request to each of the calculation nodes when the job information of the same identification number is retained as a snapshot; and clearing all the job information retained in the retention unit of the calculation node when the clear request is received from the management node, wherein the retention unit of each of the calculation nodes is provided with a first retention region and a second retention region as retention regions for retaining the job information corresponding to two time belts in order to absorb a gap corresponding to one time belt.

8. A job information acquisition method for a parallel computer including a plurality of calculation nodes executing a calculation job distributively in parallel and a management node managing the plurality of calculation nodes, the job information acquisition method comprising:

acquiring job information about a calculation job handled by each of the calculation nodes according to a period timing common to the calculation nodes;

retaining the job information in a retention unit of each of the calculation nodes, which enables retention of job information corresponding to a plurality of periods, in association with an identification number identifying the period timing at which the job information is acquired;

when a transmission request for the job information about a designated identification number is received from the management node, transmitting job information to the management node in a case where the job information exists in the retention unit, and transmitting other job information about an identification number just before the designated identification number to the management node in a case where the job information does not exist in the retention unit and the other job information exists in the retention unit;

retaining the job information in a retention unit of the management node, which enables retention of job information corresponding to a plurality of periods with respect to each of the calculation nodes, when the job information is received from each of the calculation nodes according to the transmission request;

retaining, as a snapshot, job information including the same identification number as the identification number of other job information when the job information-of is detected in the retention unit of the management node;

clearing job information other than the job information of the same identification number retained in the retention unit of the management node;

transmitting a clear request to each of the calculation nodes when the job information of the same identification number is retained as a snapshot; and clearing all the job information retained in the retention unit of the calculation node when the clear request is received from the management node, wherein the retention unit of each of the calculation nodes is provided with a first retention region and a second retention region as retention regions for retaining the lob information corresponding to two time belts in order to absorb a gap corresponding to one time belt.

* * * * *